United States Patent
Eberlein et al.

(10) Patent No.: US 10,157,052 B2
(45) Date of Patent: Dec. 18, 2018

(54) SOFTWARE CHANGE MANAGEMENT

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/280,509

(22) Filed: Sep. 29, 2016

(65) Prior Publication Data

US 2018/0088929 A1 Mar. 29, 2018

(51) Int. Cl.
  G06F 9/445 (2018.01)
  G06F 8/65 (2018.01)
  G06F 8/70 (2018.01)

(52) U.S. Cl.
  CPC . *G06F 8/65* (2013.01); *G06F 8/70* (2013.01)

(58) Field of Classification Search
  CPC .......................................................... G06F 8/65
  USPC .......................................................... 717/174
  See application file for complete search history.

(56) References Cited

U.S. PATENT DOCUMENTS

| | | | | |
|---|---|---|---|---|
| 7,516,438 B1* | 4/2009 | Leonard | ................. | G06Q 10/10 706/13 |
| 7,614,046 B2* | 11/2009 | Daniels | ..................... | G06F 8/68 717/127 |
| 7,757,269 B1* | 7/2010 | Roy-Chowdhury | ...... | G06F 8/71 726/1 |
| 7,796,500 B1* | 9/2010 | Elliott | ................. | H04L 41/0681 370/216 |
| 8,219,541 B2* | 7/2012 | Magnuson | ............. | G06Q 10/06 707/608 |
| 8,239,498 B2* | 8/2012 | Kilpatrick | .......... | G06Q 10/0875 709/217 |
| 8,584,100 B2* | 11/2013 | Xu | ........................ | G06F 11/368 717/126 |
| 8,806,423 B2* | 8/2014 | Wefers | ...................... | G06F 8/60 717/101 |
| 2014/0123108 A1* | 5/2014 | Cheluvaraju | ............. | G06F 8/75 717/123 |

* cited by examiner

*Primary Examiner* — Wei Y Zhen
*Assistant Examiner* — Lanny N Ung
(74) *Attorney, Agent, or Firm* — Schwegman Lundberg & Woessner, P.A.

(57) ABSTRACT

Methods, systems, and computer program products for managing software changes and upgrades are described. Software change information of a plurality of changed objects of a software package is obtained, the software change information comprising a name of an object being changed and a type of the object being changed. An object dependency graph for the object is generated, the object dependency graph providing a data structure for identifying dependency relationships of the object being changed, and usage statistics for the object and the object type are retrieved. An identity of a module impacted by a software change is determined based on the data structure and an overall rating of the software change is generated.

20 Claims, 15 Drawing Sheets

SOFTWARE CHANGE MANAGEMENT

FIELD

The present disclosure relates generally to improvements in computer technology and, more particularly, managing software changes and upgrades. In an example embodiment, the disclosure relates to rating the impact of a software change and facilitating software deployments.

BACKGROUND

Software changes can be a complex and risky task for an administrator. Systems may be integrated into the landscapes of other systems, may be extended by the customized software of a customer, and may be individually configured or even modified. The systems may cover a broad range of functionality, and, thus, the lines of code involved in, for example, the various classes and reports may exceed the 100 million mark. The systems may contain over a hundred thousand database tables and views, data elements, and structures. The systems may allow changing single objects (such as a data element, a report, a class, a row in a table, and the like) or a plurality of objects via a change process. The development environment and software change management system may have knowledge of thousands of different object types which can be created and transported, and may have complex import logic ("after-import-methods" which can generate table structures out of transported metadata definitions (e.g., condition techniques and the like).

BRIEF DESCRIPTION OF DRAWINGS

The present disclosure is illustrated by way of example and not limitation in the figures of the accompanying drawings, in which like references indicate similar elements and in which.

DETAILED DESCRIPTION

Figure 1A:
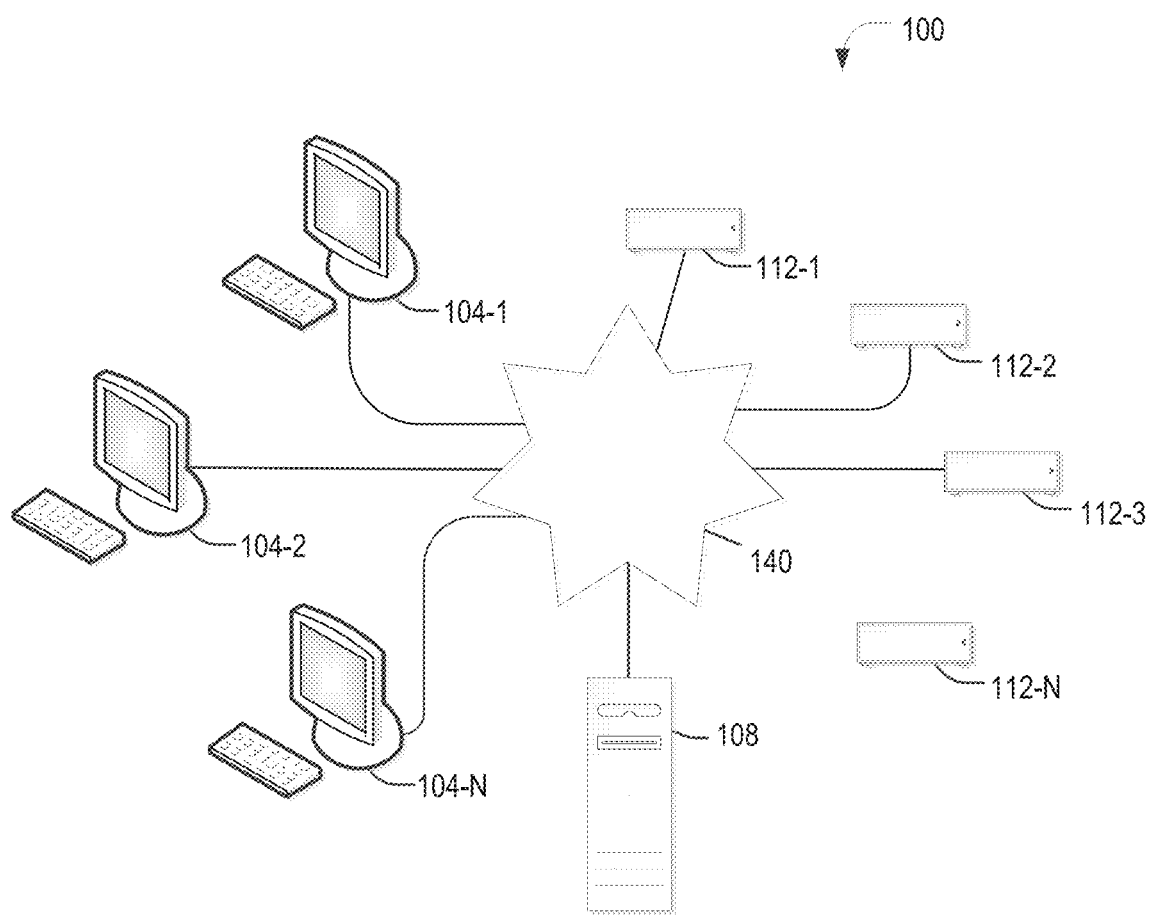
FIG. 1A is a block diagram of an example processing system for processing requests in a runtime environment, in accordance with an example embodiment.

The description that follows includes illustrative systems, methods, techniques, instruction sequences, and computing program products that embody example embodiments of the present invention. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Generally, methods, systems, apparatus, and computer program products for rating the impact of a software change and facilitating the deployment of software are described. The processes that are changed may be mission critical; thus, a change should work properly a large percentage of the time and the risk associated with a deployment should be appropriately minimized. In some cases, the systems are changed only after extensive testing, which may lead to long development cycle times, a reduced number of deployments per year, and potentially higher impact, especially for larger development and maintenance packages. On the other hand, more frequent changes may be desirable, either in response to a problem (e.g., to deploy a correction, change a configuration, and the like), to adjust to the needs of a changing environment, to provide improvements to processes, and the like. In some cases, "continuous delivery," or near continuous delivery, is desired such that relatively smaller changes are implemented with each deployment. The processes to ensure quality for the individual changes may be based on "continuous integration testing."

In general, a software change may be deployed offline, partly online (e.g., where the system is online, but in a restricted use mode where functionality associated with the software change is blocked for some users and allowed for other users), or deployed to a running system. In some cases, a software process may be officially designated as being deployable to an online system (e.g., designated as "online import"). In an attempt to minimize downtime, a user may deploy a software change to a software process that is not officially designated as being "online import." Issues may occur, however, as, for example, changes to an interface may lead to downtime for processes that rely on the former version of the interface. There may also be a non-technical impact, such as a software change that results in a change to the behavior of the end-user. For example, due to the deployment of a new user interface (UI) element, users may accidentally hit the wrong button, accidentally or intentionally cancel transactions, logoff before completing a task, create tickets requesting that a perceived problem be addressed, write complaints, write a forum entry, and the like.

In one example embodiment, tools are provided to assess the impact of a software change by, for example, determining which processes, reports, and the like will be affected by the change. The processes, reports, and the like can then be tested extensively with the software change, or deployed with less extensive testing but with an awareness of potential vulnerabilities. In one example embodiment, a rating is generated regarding the complexity of the change, the change type, the change owner, the urgency of the change, the size of the associated development team, the software layers involved, the impact of the change on a working or a failing process, and the like. The rating can be related to which changes can be deployed online, which changes are undoable, which are suitable or recommended for private testing (where a particular user(s) runs a new version of a process while other users run an old version of the process), and the like. The risk of deploying the change can be analyzed according to information about the past and current use of objects and objects that are to be changed, the planned and anticipated use of objects and objects that are to be changed, and the like.

Features

In one example embodiment, the deployment or use of a software change or feature can be limited to a single user or a set of key users (known as "feature toggle" herein). In one example embodiment, an assessment regarding private testing and the ability to control use of a deployed feature is provided. In one example embodiment, an assessment is made of whether a change may impact a process that is in "hot use" (such as a process that is presently executed many times per hour (such as thousands of times per hour) or by many users (such as by hundreds of users)). In this case, a recommendation to delay the deployment until a time of potentially lower use (such as evening hours) may be issued. In one example embodiment, an assessment is made of whether a change may impact a planned use, such as a material requirements planning (MRP) run, that is planned for the next hour. In this case, a recommendation to delay the deployment of a new version of the report until after the MRP run (or to deploy the report beforehand) may be issued. In one example embodiment, an assessment may be based on the past history of similar changes (such as a history of the impact of deploying similar changes in the past).

Deployment Procedures

In one example embodiment, a variety of deployment procedures are available to deploy a software change. A software support system may access a definition of the deployment procedures to determine which deployment procedure(s) are suitable for a given software change. For example, a Delta Transport deployment procedure uses downtime during the deployment procedure and may be suitable for smaller changes. A transport, as used herein, is a set of objects in a database, application server, operating system, and the like which are changed together (also known as a "change bundle" or "bundle" herein). A software package may contain a transport and may be deployed to a processing system to implement a software change. While the use of downtime may reduce risk, the lack of an un-do option with this deployment procedure may increase the risk of deploying the software change. An Online Delta Transport deployment procedure features no downtime during the deployment of the software change and may also be suitable for smaller changes. It may, however, pose a greater risk as an un-do option is not available. In addition, the Online Delta Transport deployment procedure only handles some object types. A Zero Downtime Upgrade deployment procedure features no downtime during the deployment of the software change and is mainly suitable for larger changes. It may pose a smaller risk as an un-do option is available and, thus, less testing of the change may be warranted since the change may be undone should a problem be encountered. It is noted that both the Online Delta Transport deployment procedure and the Zero Downtime Upgrade deployment procedure maintain an original version of the process(es) that are to be changed while a new version of the process(es) that incorporates the software change is deployed. Once the new version is complete, a transition from the original version of the process(es) to the new version may be conducted, resulting in no downtime for the system.

As noted above, different deployment procedures may be suitable for different software changes. The deployment procedure capabilities, such as an undo capability or a zero downtime maintenance capability, may be visualized using a deployment procedure feasibility metric, and an assigned rating representing a suitability of a deployment procedure may be displayed. In one example embodiment, the rating is binary (e.g., zero representing not suitable and one representing suitable). In one example embodiment, the rating is in the range of zero to one, inclusive, where a rating greater than zero is feasible and the higher the rating, the more suitable the deployment procedure (e.g., a feasible procedure with an undo feature is more suitable than a feasible procedure without an undo feature).

Software Support System in one example embodiment, a software support system (SSS) generates recommendations regarding software deployments based on a combination of data analysis, correlation of the software change with historic data about earlier software changes, correlation with monitoring data, correlation with data from planning engines and schedulers, and the like. The recommendations may be generated in real-time and may be used in planning software development and deployment activities. The data analysis may use data created during the development of the software change (such as the number and type of the objects that are changed, the test coverage, the number of developers involved, and the like), data regarding dependent objects in the target software (such as tables using a structure, using a data element, and the like, where the data element is changed), and the like. Historic data may be assembled during the lifecycle of the system.

Each deployed change is analyzed and the results of the deployment (such as received return codes, duration of deployment, amount of downtime, and the like) are persisted along with data about the software change. This can be extended to include data regarding the reaction of the system and the reaction of users to the deployment of the software change (such as compile errors, runtime errors, generation errors, decreased performance, and the like). The persisted data may be used in assessing the impact of future software changes.

Ratings

In one example embodiment, data identifying objects that are currently used, recently used (such as objects used during the past hour), or both can be correlated with changed objects or with objects that depend on the changed objects. This enables rating the impact of the software change on the content of the system (such as the deployed processes) and on the current use of content and objects.

In one example embodiment, if, for example, a table structure is to be modified by the software change or if a data migration report is needed to change a table, a size of the table is determined. Determining the size of the table enables rating and estimating the duration of the software change beforehand since the structure change and migration usually depend on the table size.

In one example embodiment, objects that are used by a scheduled event (such as a scheduled batch job) are identified; these objects can then be correlated with the changed objects and the objects that are dependent on the changed objects. The information obtained can then be presented to, for example, an administrator, and the changes can be rated using thresholds (e.g., using computed averages of the historic information) to provide a high-level assessment of the risks associated with the software change. The rating may be presented at a traffic light level where, for example, a green indicator may indicate that a change is low risk and the deployment should proceed, a red indicator may indicate that a change is high risk and that the deployment should not occur or should occur only after extensive testing, and a yellow indicator may indicate that a change is of medium risk and the deployment should occur with caution (such as at a time when the impact will be minimal), as described more fully below in the section entitled "Aggregated Traffic Lights."

In one example embodiment, the software support system reads the respective software change (known as CX herein) from the change control system and retrieves the object names and the object types being changed (known as CX_CONTENT herein). The software support system then calls an object dependency graph calculator with an indication of the target source code (including an identification of the version of the target source code). The object dependency graph calculator generates and returns to the software support system a graph or list of object names and object types (known as GX herein) that are dependent on the process(es) associated with the software change.

Usage statistics for the objects of CX_CONTENT and GX may be retrieved, if information about the object and object type are available. The usage statistics may be retrieved by a call by the software support system to a system monitor and a list of usage statistics (CGX_USAGE_LIST) is then returned to the software support system. If, for a certain object type (e.g., a single table entry), no information is available, information about a higher level object can be retrieved (e.g., regarding the table that the entry belongs to). For the used objects and the to-be-changed objects, the impact on the user interfaces, the processes, and the like can be computed based on the object dependency graph.

A binary list (such as a list of "yes" or "no" entries) for each object in the list of object names and types (CX_CONTENT) and the list of dependent object names (GX) may be determined where the binary list indicates if the corresponding object is used by a scheduled event within a given time horizon (e.g., a report scheduled as a batch job in the next three hours, a user interface scheduled to be used in the next five hours, and the like). The binary list may be generated and retrieved by a call to a system scheduler by the software support system. If information cannot be provided regarding the object, information regarding a higher level object can be retrieved. Alternatively, the object list can be retrieved from the system scheduler and the intersection of objects of the scheduled event and objects in the list of changed and dependent objects is computed in the software support system; the determined intersection provides an indication of the impact of the software change.

Data regarding the software change (e.g., the list of developers creating the change, the amount of time it took for the developers to create the change, information regarding the number of change iterations during development, applied quality assurance processes, and the like) may be retrieved from the database of a data collector. The information may be stored in a database associated with the software change for fixture processing.

In one example embodiment, a list of modules impacted by the software change is determined and a variety of ratings are determined, such as a development readiness rating, a relative object list rating, a dependent object rating, and a hot spot hits rating, as described more fully below by way of example.

Development Readiness Rating

The development readiness rating rates the development process cleanness (e.g., the thoroughness of the development process in terms of a full process vs. a shortened process, comprehensive testing vs. review by a single developer, number and extent of reliability reviews, and the like) where, for example, one is defined as excellent and zero is defined as poor. This may include the extent of the test coverage and the test results of the impacted modules (where test coverage by unit tests of the software changes is collected). Test coverage, test results of the unit tests, test results of the integration tests, and the like may be displayed.

In one example embodiment, the development readiness rating is defined, for example, as:

$$\text{Development Readiness Rating} = \Sigma_{i=1}^{n} DTC_i * DTS_i$$

where n is the count of modules, $DTC_i$ is the test coverage percentage for module i, and $DTS_i$ is the percentage of successful tests for module i.

Relative Object List Rating

The relative object list rating rates the deployment impact risk where, for example, zero is low impact and one is high impact. In one example embodiment, the software support system reads data from the change transport system (CTS) to determine which objects are contained in the transport (which may, also be displayed via the UI).

The relative object list rating may be defined, for example, as:

$$\text{Relative Rating Transport} = \text{Rating\_Transport}/\text{Number\_Objects}$$

where Number_Objects is the number of objects in the transport. The Rating_Transport (the object list rating) may be defined, for example, as:

$$\text{Rating\_Transport} = \Sigma_{i=1}^{n}(NT_i * OCR_i)$$

where a ListOfObjects contains the details of the objects in the transport, n is the count of different object types in the transport, $NT_i$ is the number of objects of the corresponding object type in the transport, and $OCR_i$ is the object criticality rating. The object criticality rating ($OCR_i$) may be table structure (DDIC) changes (where, for example, 1 may indicate that changes to a table structure are most critical), code changes (where, for example, 0.2 may indicate that code changes are critical), roles and authorizations (where, for example, 0.1 may indicate that roles and authorizations are a less critical change since a user may simply lose authorization in the event of a failure), UI (where, for example, 0.01 may indicate that changes to a user interface are least critical), and the like. The OCR can be determined statistically in tests by the software provider. For a series of test deployments, for each object type $X_i$, count the number of objects of this type being deployed and the number of errors encountered for this object type during one of the test deployments (the fail rate). Compute the average fail rate of deploying an object of type for a plurality of test deployments. Select the largest fail rate (e.g., object type $X_m$) and normalize the fail rate for each object type to the largest fail rate. Define the OCR as normalized $X_i/X_m$.

Toggle Feature

In one example embodiment, a determination may be made as to whether a software change is switchable via a feature toggle, e.g., whether the software change can be switched on and off, or otherwise controlled, for a subset of users. If a feature can be switched off, the deployment of the feature may be considered less risky. In one example embodiment, an attribute from the CTS indicates the switch capability of each object being transported. An object toggle-ability factor $OTAF_i$ may be defined for each object i where $OTAF_i$ is between zero and one, and where zero indicates that the feature cannot be toggled and a one indicates that the feature can be toggled. The object list rating may then be adjusted according to:

$$\text{Rating\_Transport} = \Sigma_{i=1}^{n}(NT_i * OCR_i * OTAF_i)$$

Dependent Object Rating

The dependent object rating rates the system environment that is impacted by the software change where, for example, the smaller the rating, the lower the impact, and where the rating can range from zero to greater than one. In one example embodiment, the dependent object rating is normalized to the highest historic value, i.e., each dependent object rating of a transport is compared to the highest historic value and then all the dependent object ratings are normalized to the new highest historic value.

In one example embodiment, an object dependency graph is computed. The software support system requests that the object dependency graph calculator computes the object dependency graph with each object in the transport. The count of objects and the object types that are affected by the change are computed and may be presented via the user interface.

The parameters of the dependent object rating may include the number of dependent objects of each type ($ND_i$) and the object criticality rating ($OCR_i$). The determined transport dependency rating may be defined as:

$$\text{Dependency Rating Transport} = \Sigma_{i=1}^{n}(ND_i * OCR_i)$$

where n is the count of different object types in the transport. The dependent object rating may be defined as:

$$\text{Dependent Object Rating Transport} = \text{Dependency Rating Transport/Count\_Objects}$$

where Count_Objects is a count of objects in the transport

Hot Spot Hits Rating

The hot spot hits rating rates the deployment impact risk on hot spots where, for example, a zero represents low impact and a one represents high impact. In one example embodiment, critical changes, such as changes to large tables, external interfaces, and the like, are identified. A list of objects is generated based on the objects in a repository of critical objects (such as changes to large tables, external interfaces, and the like and elements identified by, for example, a user or administrator). The intersection of the set of objects of the dependency graph and the list of objects in the repository of critical objects is computed. The size and identity of the largest converted or migrated tables may be presented via a UI (such as the ten largest tables affected by the software change). In one example embodiment, if the user interfaces are changed, information about the usage of the interfaces (e.g., in cross system processes) may be presented via a UI.

In one example embodiment, an analysis of hot spots, such as large tables, the most frequently called reports, and the like, is conducted. These objects are written to a list of objects (HotSpotList) that are impacted and is determined based on the repository of critical objects described above. The intersection of the objects (known as IntersectObjects herein) on the list of hot spot objects (HotSpotList) and the list of dependent objects (DependentObjectList) is determined. The hot spot rating may be defined based on the objects of IntersectObjects as, for example:

$$\text{Hot Spot Rating Transport} = \Sigma_{i=1}^{n}(ND_i * OCR_i)$$

where n is the count of different object types in IntersectObjects, $ND_i$ is the count of objects of the corresponding object type in IntersectObjects, and $OCR_i$ is the object criticality rating for the corresponding object type.

Aggregated Traffic Lights

In one example embodiment, aggregated "traffic lights" may be generated and displayed. The traffic light indicates a rating in a basic graphical form, such as via the color of a graphical element. Each aggregated traffic light may be based on a single parameter or based on a combination of parameters. The parameters may be individually weighted and summed to generate a rating and visually indicate the difference between transports on a single user interface screen. An example of an aggregated rating is:

Aggregated Rating=

(Development Readiness Rating*$\text{weight}_{DRR}$+

Relative Rating Transport*$\text{weight}_{RRT}$+

Dependent Object Rating Transport*$\text{weight}_{DORT}$+

Hot Spot Rating Transport*$\text{weight}_{HSRT}$)/($\text{weight}_{DRR}$+ $\text{weight}_{RRT}$+$\text{weight}_{DORT}$+$\text{weight}_{HSRT}$)

In one example embodiment, the weights are defined as follows:
$\text{weight}_{DRR}$=0.2
$\text{weight}_{RRT}$=0.7
$\text{weight}_{DORT}$=0.5
$\text{weight}_{HSRT}$=1

In one example embodiment, the weights are defined within the following ranges:
$\text{weight}_{DRR}$=0.0 to 0.5
$\text{weight}_{RRT}$=0.5 to 0.8
$\text{weight}_{DORT}$=0.25 to 0.75
$\text{weight}_{HSRT}$=0.75 to 1

In one example embodiment, the weights are defined according to a user's preference. An example of a mapping of a visual traffic light is:
Green for an aggregated rating <0.3
Yellow for an aggregated rating between 0.3 and 0.5, inclusive
Red for an aggregated rating >0.5.

Mapping to a Process Level

In one example embodiment, the process, "Fiori tile" (a user interface element widget) definition, and the like is analyzed to determine which of the processes and the like use objects that are changed or Objects that are affected by the change. The intersection of the object dependency graph and the process definitions may be computed to map low-level technical elements (such as tables, records, and the like) to processes and other elements that would be recognizable by a user. The determined processes and other elements may be displayed with the corresponding traffic light to inform the user of the identity of the affected component(s). Similar processing may be done for batch programs. In addition, a list of UIs, processes, batch programs, and the like which will be impacted by the change may be described at a lower granularity by a list of impacted modules.

Deployment Method

In one example embodiment, the deployment procedures appropriate for a software change are determined based on the software change content. Each deployment procedure may be capable of zero downtime maintenance, undo-ability (e.g., a software change may be undone), and the like. The deployment procedure definitions and the transport content (from the CTS) may be read, and the deployment procedures which are suitable for (e.g., compatible with) the transport content may be determined. For example, if a procedure cannot deploy a data dictionary (DDIC) and there is a DDIC on the list, the use of the deployment procedure is not possible. If a deployment procedure is efficient for 100,000 objects and the transport contains only 10 objects, the deployment procedure may also not be selected. The deployment procedure options that exist may be presented via the user interface. Furthermore, each deployment procedure may be suitable to deploy only certain object types (e.g., to build archives only, advanced business application programming (ABAP) sources only, ABAP source plus DDIC, and the like), certain object volume ranges (e.g., 0 to 10,000 objects; greater than 10,000 objects), and the like.

Transport content may be mapped to a deployment procedure based on the capability of the deployment procedures. In one example embodiment, a check is made to determine if all the object types of the transport content are supported by the candidate deployment procedure; if all the object types are not supported by the candidate deployment procedure, the DPi feasibility rating is set to zero. If the number of object types of the transport content is not within the range of the candidate deployment procedure, the DPi feasibility is set to zero. (In one example embodiment, if the number of object types of the transport content is close to but not within the range of the candidate deployment procedure, the DPi procedure feasibility rating is set to a value between zero and one, depending on how far the number of objects types is outside of the range using, for example, the DPi object count rating algorithm described more fully below by way of example.) If all the object types of the transport content are supported by the candidate deployment procedure and if the number of object types of the transport content is within the range of the candidate deployment procedure, the object count range, the number of transports, an indication of a ZDM capability, an indication of an undo capability, and the like are displayed via the UI. If undo is supported, the risk Rating_Transport is multiplied by a configurable easing factor, e.g. 0.1.

In one example embodiment, a deployment procedure (Dpi) object count rating is set to a value between zero and one based on the following algorithm. Define the number of objects in the transport as Nr_objects, the range for the object count for the deployment procedure $Dp_i$ as between $R_{i\_low}$ and $R_{i\_high}$ (inclusive), and the range width as $Wi=(R_{i\_high}-R_{i\_low})$.

If Nr_objects $<R_{i\_low}-Wi/10$, set DPi object count rating to 0;
else if $R_{i\_low}-Wi/10<$Nr_objects $<R_{i\_low}$,
set DPi object count rating to 1−($R_{i\_low}$−Nr_objects)/(W/10);
else if $R_{i\_low}<$Nr_objects $<R_{i\_high}$, set DPi object count rating to 1,
else if $R_{i\_high}<$Nr_objects $<R_{i\_high}+W/10$,
set DPi object count rating to 1−(Nr_objects−Ri_high)/(W/10);
else if Nr_objects $>R_{i\_high}+W/10$, set DPi object count rating to 0.

Similar formulas can be provided for ranges 0<Nr_objects <Ri_max or Ri_min<Nr_objects.

In one example embodiment, the best deployment window is determined based on the number of dependent objects in the transport (NT) and the number of calls per hour per object during, for example, the last hour, the last 30 minutes, and the like. The number of calls per hour per object may be shown in terms of, for example, a maximum (e.g., 100,000 per hour) or average (e.g., 5,000 per hour), and details may be displayed for the top deployment windows (such as the top ten, the top 10%, and the like). The details may include, for example, the number of calls per hour window for the last 24 hours, the maximum number of calls per hour window, and the average number of calls per hour window (where an hour window is a time window with a length of one hour).

If the processes are exhibiting a periodic pattern (such as being executed at relatively the same time each day), the SSS may recommend a particular time of day when the process(es) that may be impacted by the software change are expected to be at a minimal level of execution. In one example embodiment, a display may be presented via a user interface that illustrates the time of execution of various processes during, for example, the past 24 hours and a projection that the pattern will repeat over the next 24 hours. In one example embodiment, the system highlights the window hours having the minimum level(s) of execution.

In one example embodiment, the percentage of scheduled batch jobs may be computed and displayed via a user interface. The percentage of impacted batches NRI for, for example, each hour of the next 24 hours may be computed and displayed (where NI is the number of batch reports impacted by the import, NB is the number of batch reports planned, and NRI=NI/NB). A user may drill down and view which batch job(s) are impacted, and reschedule a batch job, if possible and necessary.

FIG. 1A is a block diagram of an example processing system 100 for processing requests in a runtime environment, in accordance with an example embodiment. In one example embodiment, the system 100 comprises client devices 104-1, . . . 104-N (collectively known as client devices 104 hereinafter), a load balancer 108, application nodes 112-1, . . . 112-N (collectively known as application nodes 112 hereinafter), and a network 140.

Each client device 104 may be a personal computer (PC), a tablet computer, a mobile phone, a telephone, a personal digital assistant (PDA), a wearable computing device (e.g., a smartwatch), or any other appropriate computer device. Client device 104 may include a user interface module. In one example embodiment, the user interface module may include a web browser program and/or an application, such as a mobile application, an electronic mail application, and the like. Although a detailed description is only illustrated for the client device 104, it is noted that other user devices may have corresponding elements with the same functionality.

The network 140 may be an ad hoc network, a switch, a router, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, another type of network, a network of interconnected networks, a combination of two or more such networks, and the like.

The load balancer 108 receives a request from a client device 104 and forwards the request to an application node 112, and forwards responses from the application node 112 to the client device 104. The load balancer 108 also maintains session information in a session table. The maintained information may include, for each node, the open session identifiers, a time of the last request, and the like.

The application nodes 112 process requests from client devices 104 and return responses for the processed requests. In the example embodiment of FIG. 14, the application nodes 112 receive requests from the client devices 104 via the load balancer 108 and return the corresponding responses to the client devices 104 via the load balancer 108.

Figure 1B:
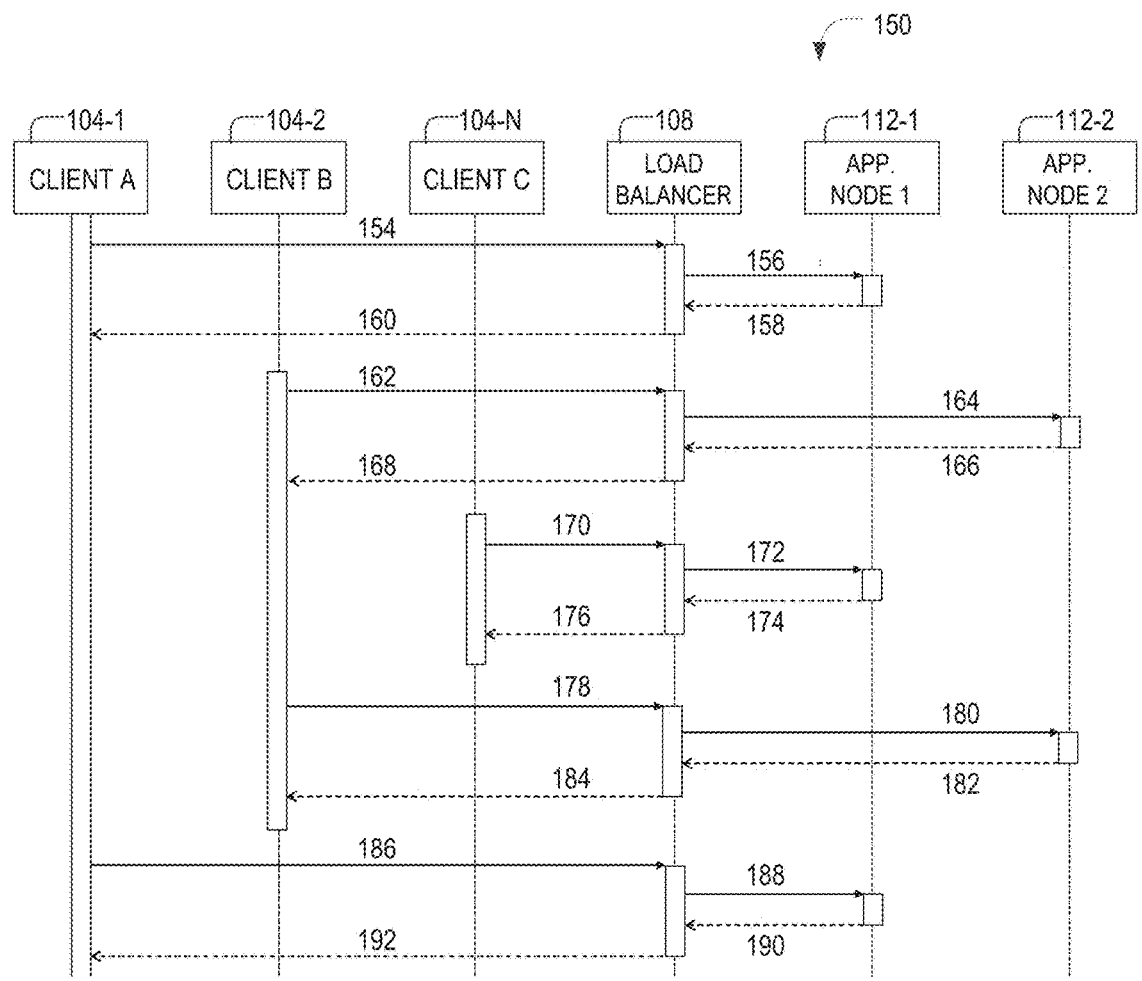
FIG. 1B is an example sequence diagram for dispatching requests in the customized runtime environment, according to an example embodiment.

FIG. 1B is an example sequence diagram 150 for dispatching requests in the customized runtime environment, according to an example embodiment. As illustrated in FIG. 1B, the client device 104-1 (client A) issues a request 154 to the load balancer 108 and the load balancer 108 forwards a request 156 to the application node 112-1. Once the request 156 is processed, the application node 112-1 returns a response 158 to the load balancer 108. The load balancer 108 returns a response 160 to the client device 104-1.

Similarly, the client device 104-2 (client B) issues a request 162 to the load balancer 108 and the load balancer 108 forwards a request 164 to the application node 112-2. Once the request 164 is processed, the application node 112-2 returns a response 166 to the load balancer 108 and the load balancer 108 returns a response 168 to the client device 104-2. The client device 104-N (client C) issues a request 170 to the application node 112-1 via the load balancer 108 (see, request 172, response 174, and response 176). In the example of request 178 from the client device 104-2, the request 178 includes a close command, which is forwarded from the load balancer 108 to the application node 112-2 via request 180. The application node 112-2 generates a response 182 and closes the corresponding session. The load balancer 108 forwards response 184 to the client device 104-2.

Also, as illustrated in FIG. 1B, client device 104-1 issues a second request 186 to the load balancer 108 and the load balancer 108 forwards a request 188 to the application node 112-1. Once the request 188 is processed, the application node 112-1 returns a response 190 to the load balancer 108. In this case, the application node 112-1 returns the response 192 to the client device 104-1

Figure 2:
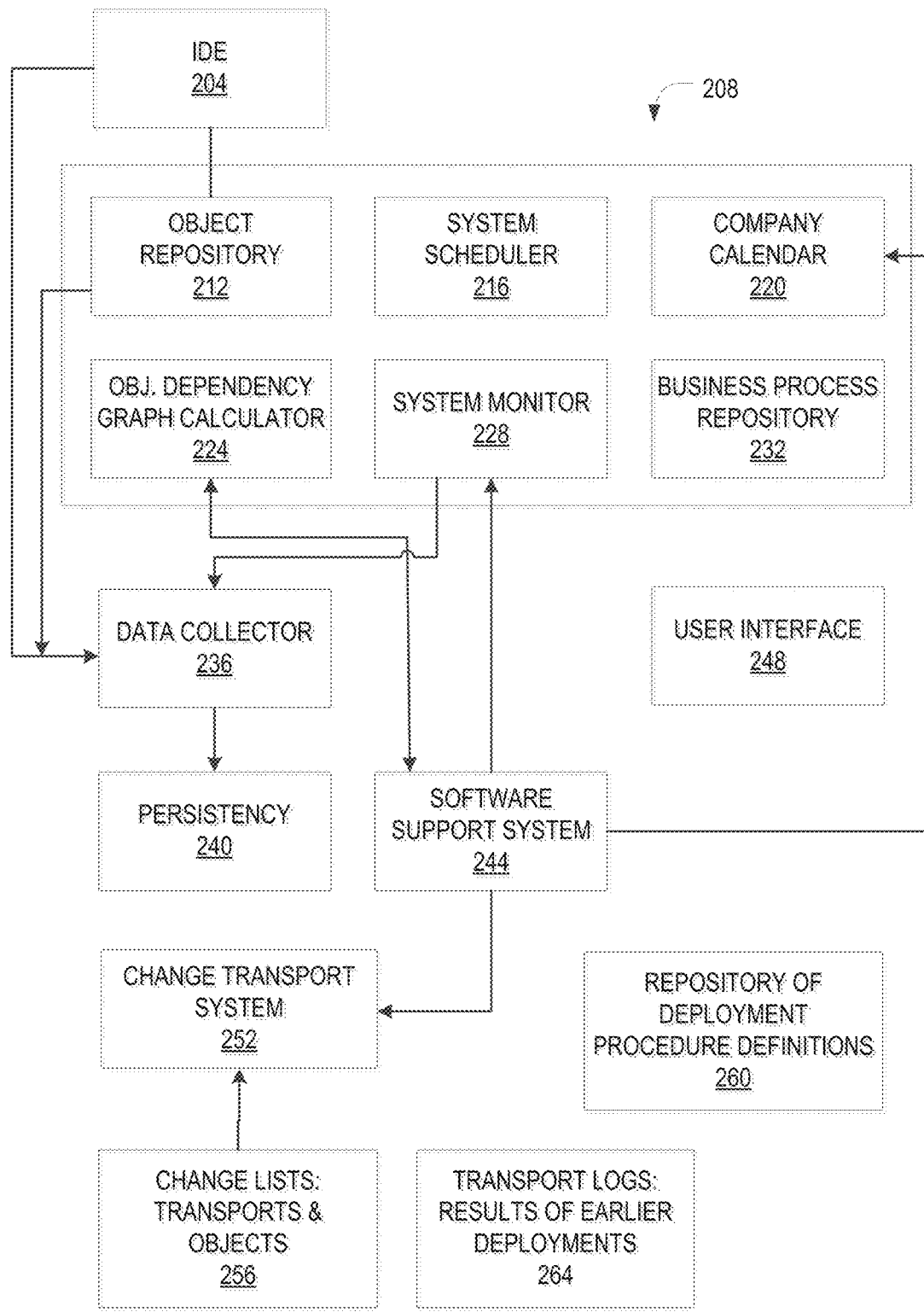
FIG. 2 is a block diagram of an example system for managing software changes and upgrades, facilitating software deployments, and rating the impact of a software change, in accordance with an example embodiment.

FIG. 2 is a block diagram of an example system for managing software changes and upgrades, facilitating software deployments, and rating the impact of a software change, in accordance with an example embodiment. In one example embodiment, a software support system (SSS) 244 generates recommendations regarding the impact of a software change and facilitates the management of deploying software based on a combination of data analysis, correlation of the software change with historic data (regarding earlier software changes), correlation with monitoring data, correlation with data from planning engines and schedulers, and the like.

An integrated development environment (IDE) 204 is a software application that enables the development of software and software changes by computer programmers. The IDE 204 may include a source code editor, a software debugger, and tools for building the software programs.

A business process repository 232 contains, for example, business processes, user interfaces, and the like for a runtime environment. An object repository 212 contains, for example, the objects for the business processes and the like for the runtime environment.

A system scheduler 216 (e.g., a planning engine) schedules planned events, such as scheduled batch jobs. A company calendar 220 identifies "external" events that create demand on the system (e.g., a truck with goods that is scheduled to arrive, a board meeting that is planned in a particular conference room, and the like).

An object dependency graph calculator 224, given an object (such as an object n a transport that is to be changed), determines which other objects use or are dependent upon the given object. The determined objects are potentially impacted by the software change.

A system monitor 228 collects and provides information, such as which reports, tables, UIs, and the like are currently in use, or were recently in use (such as used within the last three minutes, within the last three hours, and the like).

A data collector 236 collects data during the creation of the software change, during the deployment of the software change, and after the deployment of the software change. The data collector 236 has access to a persistency system 240, such as a database, to store collected data. The data collector 236 has access to the content of a software change, the list of objects and object types, and other metadata associated with the software change. Data collection functionality may be embedded in the change management and development systems. The data for the creation and deployment statistics associated with each software change is collected and stored by the data collector 236.

A user interface module 248 presents information to a user, such as an administrator. The user interface module 248 presents the data retrieved by the software support system 244 in a consolidated way with metrics and recommendations, and enables a user to drill down to more detailed information.

A repository of deployment procedure definitions 260 contains the definitions and capabilities of the deployment procedures regarding downtime, revoke-ability (e.g., an undo capability), whether the impact is user- or tenant-local or system-wide, supported object types, supported object counts, and the like.

A change transport system (CTS) 252 allows for reading past and planned software changes (and their content), documentation about the change, change lists 256 (containing, for example, changes to transports and objects), transport logs 264 (containing, for example, results of earlier deployments), and the like.

A database (not shown) within the CTS 252 stores information regarding the software deployment and the results of the software deployment. The information may be used to create statistics on a large number of deployments and to evaluate earlier deployments for information useful in assessing a new deployment. For example, an error log containing information regarding runtime errors in objects that were changed by an earlier deployment or objects that are dependent on the changed object(s) may provide an indication of the success or failure of a new software deployment.

Figure 3:
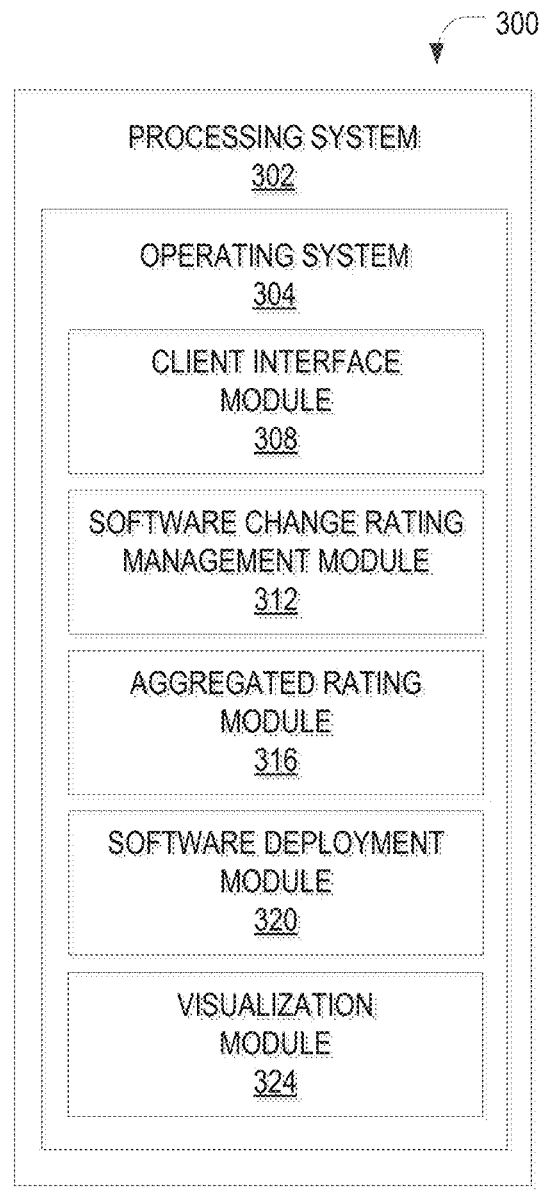
FIG. 3 is a block diagram of an example apparatus for managing software changes and upgrades, facilitating software deployments, and rating the impact of a software change, in accordance with an example embodiment.

FIG. 3 is a block diagram of an example apparatus 300 for managing software changes and upgrades, facilitating software deployments, and rating the impact of a software change, in accordance with an example embodiment. The apparatus 300 is shown to include a processing system 302 that may be implemented on a client or other processing device, and that includes an operating system 304 for executing software instructions. In one example embodiment, the apparatus 300 may implement the SSS 244.

In accordance with an example embodiment, the apparatus 300 may include a client interface module 308, a software change rating management module 312, an aggregated rating module 316, a software deployment module 320, and a visualization module 324.

The client interface module 308 presents information that summarizes, characterizes, and rates the impact of a software change, information related to the suitability of a deployment procedure for deploying a software change, and the like.

The software change rating management module 312 reads information associated with a software change, requests the generation of an object dependency graph, and generates a summary of the impact of the software change, as described more fully below by way of example in conjunction with FIG. 4.

The aggregated rating module 316 computes a variety of ratings, such as the development readiness rating, the relative object list rating, the dependent object rating, the hot spot hits rating, and the aggregated rating, as described more fully below by way of example in conjunction with FIG. 5. The aggregated rating module 316 creates an aggregated traffic light for visualizing the impact of a software change, as described more fully below by way of example in conjunction with FIG. 6.

The software deployment module 320 rates deployment procedures for a proposed software change and facilitates the selection of a deployment procedure, as described more fully below by way of example in conjunction with FIGS. 7A-7C. In one example embodiment, the software deployment module 320 selects the deployment procedure for deploying a software change.

The visualization module 324 generates information that summarizes, characterizes, and rates the impact of a software change, as described more fully below by way of example in conjunction with FIGS. 8A-8B, 9A-9B, and 10. The generated information may be presented to a user via the client interface module 308.

Figure 4:
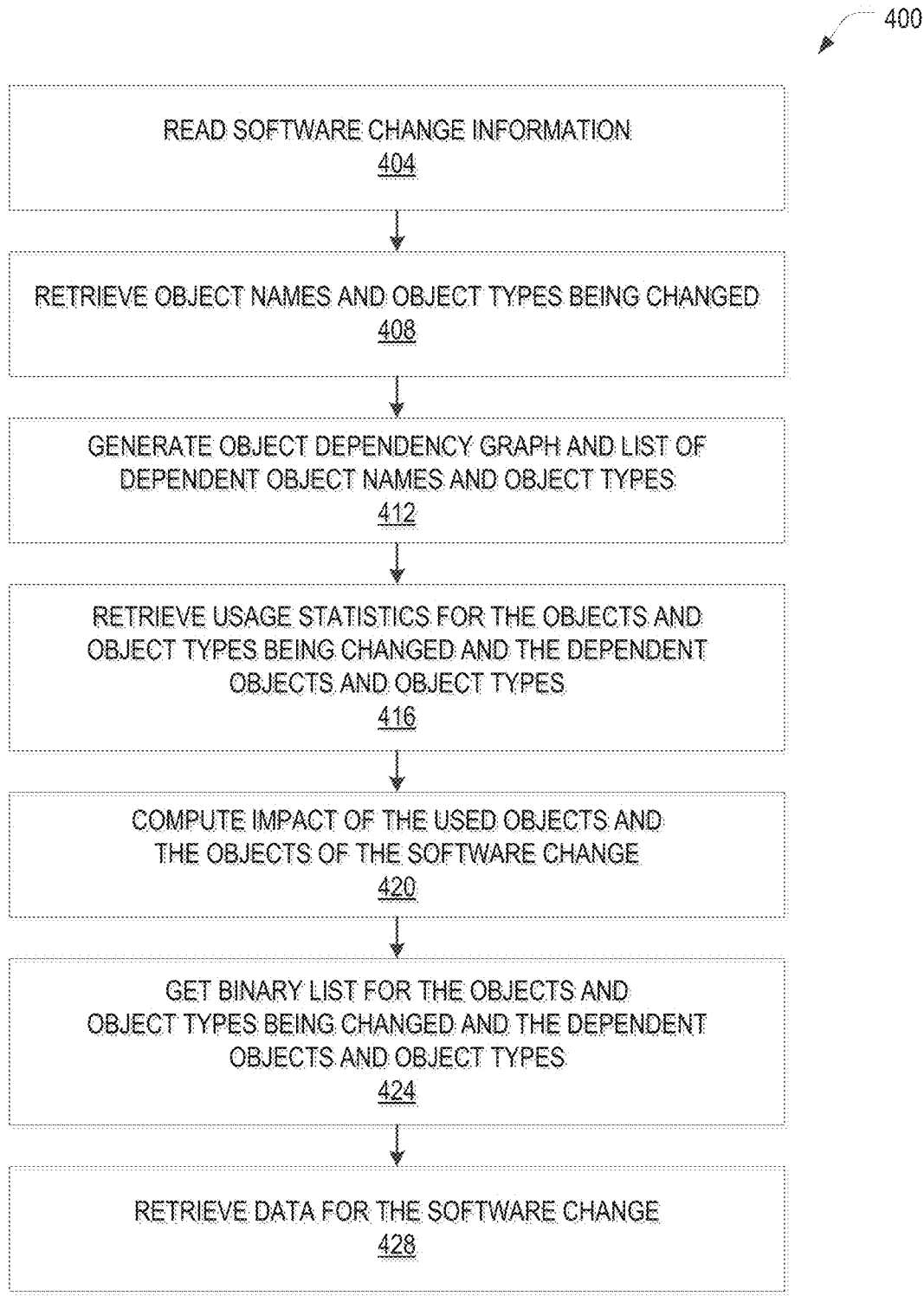
FIG. 4 is a flowchart for an example method for determining an impact of a software change, according to an example embodiment.

FIG. 4 is a flowchart for an example method 400 for determining an impact of a software change, according to an example embodiment. In one example embodiment, the method 400 is performed by the software support system 244.

In one example embodiment, the respective software change information (CX) is read from the change transport system 252 (operation 404). The object names and the object types being changed (CX_CONTENT) are retrieved (operation 408).

An object dependency graph calculator generates an object dependency graph based on the identity of the target source code. The object dependency graph calculator may also generate and return a list of dependent object names and object types (GX) to the software support system 244 (operation 412).

The usage statistics for the objects of CX_CONTENT and GX (if information about the object and object type are available) is retrieved (operation 416). The usage statistics may be compiled by the system monitor 228 on an on-going basis. A list of usage statistics (CGX_USAGE_LIST) is returned to the software support system 244. If, for a certain object type (e.g., a single table entry), no information is available, information about a higher level object can be retrieved (e.g., regarding the table that the entry belongs to).

For the objects of the software change (e.g., of CX_CONTENT and GX) that are both used and to-be-changed, the UIs, processes, and the like that are impacted by the software change are identified based on, for example, the dependency object graph (operation 420).

A binary list (such as list of "yes" or "no" entries) for each object in the list of object names and types (CX_CONTENT) and the list of dependent object names (GX) is retrieved (operation 424). The binary list indicates if the corresponding object is contained in a scheduled event within a given time horizon (e.g., a report scheduled as batch job, a UI scheduled to be used, a business process, and the like). The binary list may be retrieved, for example, from the system scheduler 216. If information cannot be provided regarding the object, information regarding a higher level object can be retrieved. Alternatively, the object list can be retrieved from the system scheduler 216 and the intersection of objects of a scheduled event and objects in the list of changed and dependent objects is computed in the software support system 244; the determined intersection provides an indication of the impact of the software change.

Data for the software change CX (e.g., the list of developers creating the change, the duration of the creation, information regarding the number of change iterations during development, applied quality assurance processes, and the like) is retrieved (operation 428). The data for the software change may be retrieved by the data collector 236 from, for example, the persistency system 240.

Figure 5A:
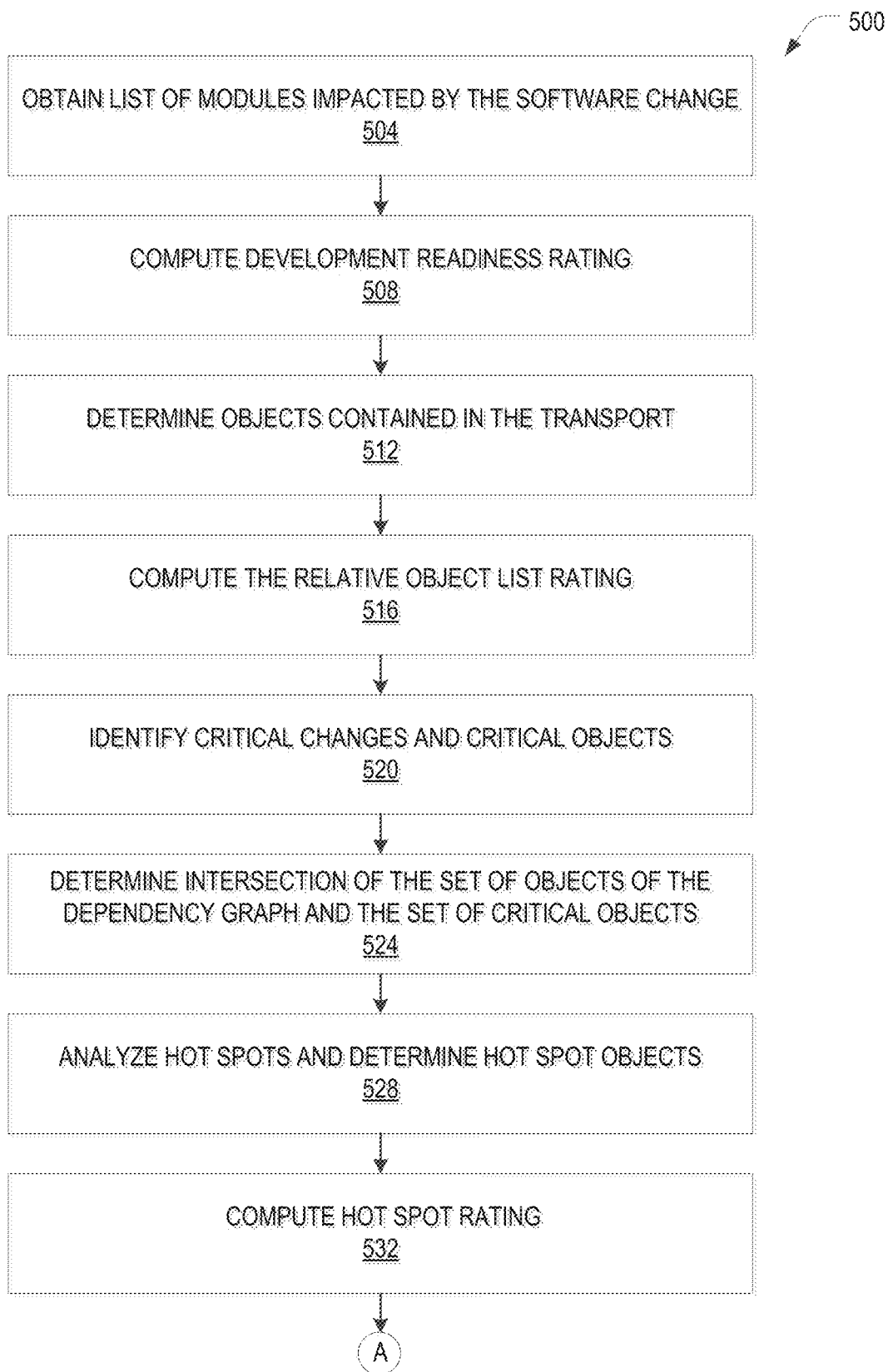
FIGS. 5A and 5B are a flowchart for an example method for determining an impact rating of a software change, according to an example embodiment.
Figure 5B:
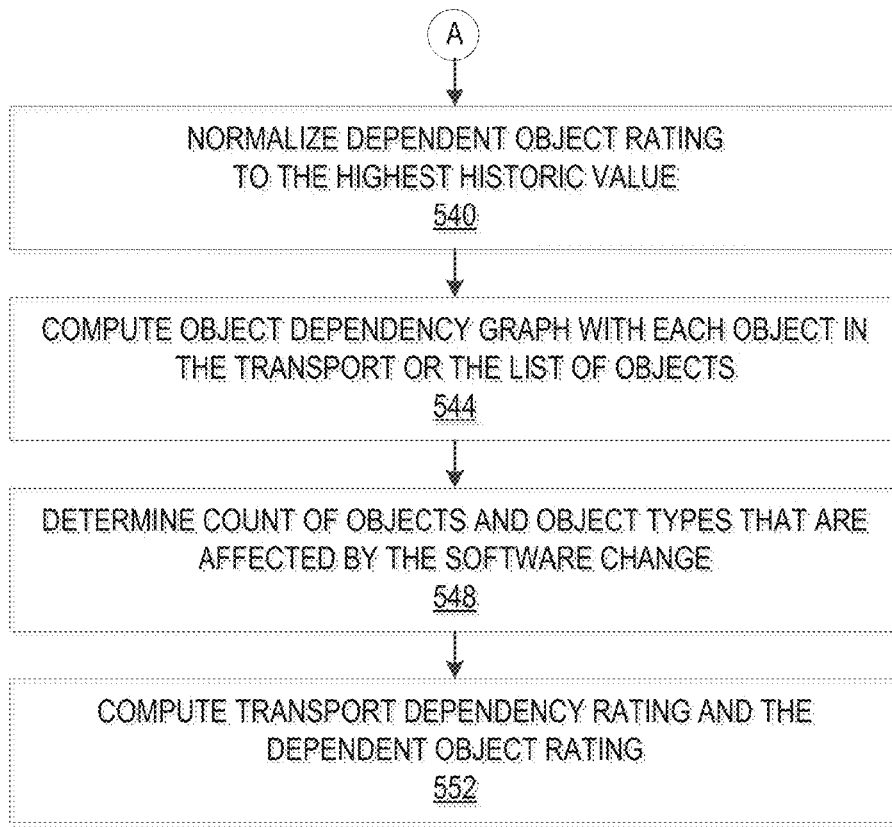

FIGS. 5A-5B are a flowchart for an example method 500 for determining an impact rating of a software change, according to an example embodiment. In one example embodiment, the method 500 is performed by the SSS 244. A list of modules impacted by the software change are determined and a set of ratings are determined, such as a development readiness rating, a relative object list rating, a dependent object rating, and a hot spot rating.

Initially, the list of modules impacted by the software change, such as the list of processes determined by operation 420, is obtained (operation 504). The development readiness rating is computed (operation 508). In one example embodiment, the development readiness rating is defined, for example, as:

$$\text{Development Readiness Rating} = \sum_{i=1}^{n} DTC_i * DTS_i$$

where n is the count of modules, $DTC_i$ is the test coverage percentage for module i, and $DTS_i$ is the percentage of successful tests for module i.

The objects contained in the transport are determined (operation 512). For example, the software support system 244 may read a list of objects from the CTS 252. The relative object list rating is computed (operation 516). The relative object list rating may be defined, for example, as:

$$\text{Relative Rating Transport} = \text{Rating\_Transport}/\text{Number\_Objects}$$

where Number_Objects is the number of objects in the transport. The Rating_Transport (the object list rating) may be defined, for example, as:

$$\text{Rating\_Transport} = \sum_{i=1}^{n}(NT_i * OCR_i)$$

where a ListOfObjects contains the details of the objects in the transport, n is the count of different object types in the transport, $NT_i$ is the number of objects of the corresponding object type in the transport, and $OCR_i$ is the object criticality rating.

Critical changes, such as changes to large tables, external interfaces, and the like, are identified and objects in the repository of critical objects are determined (such as the large tables, external interfaces, and the like that are altered as well as elements identified by, for example, a user or administrator) (operation 520). The intersection of the set of objects of the dependency graph and the list of objects in the repository of critical objects is determined (operation 524).

An analysis of hot spots, such as large tables, the most frequently called reports, and the like, is conducted (operation 528). For example, hot spots may be identified by analyzing the usage statistics and a list of objects (HotSpot-List) is determined based on the repository of critical objects. The hot spot rating is computed (operation 532). The hot spot rating may be defined based on the objects of IntersectObjects as, for example:

$$\text{Hot Spot Rating Transport} = \Sigma_{i=1}^{n}(ND_i * OCR_i)$$

where n is the count of different object types in IntersectObjects, $ND_i$ is the count of objects of the corresponding object type in IntersectObjects, and $OCR_i$ is the object criticality rating for the corresponding object type.

The dependent object rating is normalized to the highest historic value, i.e., each transport value is compared to the highest historic value and then all the transport values are normalized to the new highest historic value (operation 540, FIG. 5B).

An object dependency graph is computed (operation 544). The software support system 244 requests that the object dependency graph calculator 224 computes the object dependency graph with each object in the transport. On one example embodiment, the object dependency graph computed in operation 412, if available, may be utilized in operation 544.)

The count of objects and the object types that are affected by the change are computed (operation 548). The parameters may include the number of dependent objects of the corresponding type ($ND_i$) and the object criticality rating ($OCR_i$). The transport dependency rating and the dependent object rating are computed (operation 552). The determined transport dependency rating may be defined as:

$$\text{Dependency Rating Transport} = \Sigma_{i=1}^{n}(ND_i * OCR_i)$$

where n is the count of different object types in the transport. The dependent object rating may be defined as:

Dependent Object Rating Transport=Dependency Rating Transport/Count_Objects where Count_Objects is a count of objects in the transport.

Figure 6:
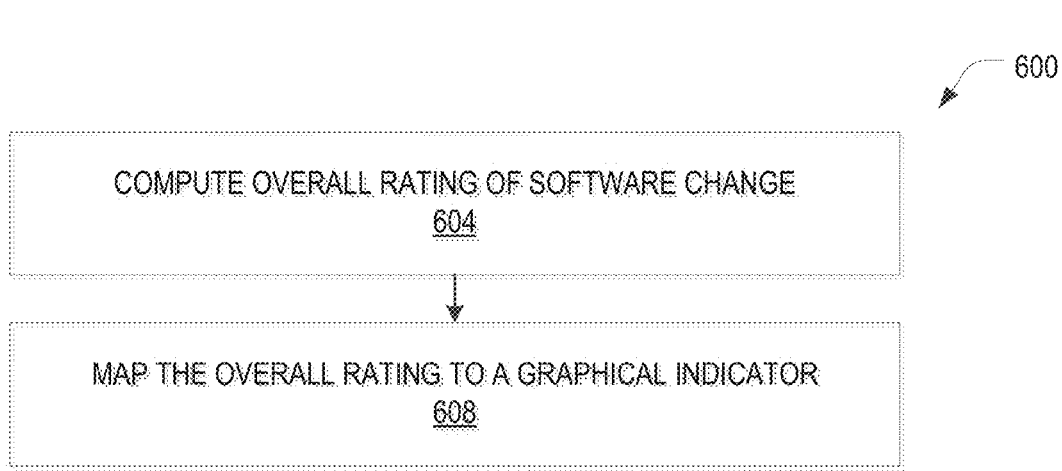
FIG. 6 is a flowchart for an example method for determining an aggregated traffic light for visualizing an impact of a software change, according to an example embodiment.

FIG. 6 is a flowchart for an example method 600 for determining an aggregated traffic light for visualizing an impact of a software change, according to an example embodiment. In one example embodiment, the method 600 is performed by the SSS 244.

In one example embodiment, an overall impact rating may be computed (operation 604). An example of an aggregated rating (overall impact rating) is:

Aggregated_Rating=

(Development Readiness Rating*$\text{weight}_{DRR}$+

Relative Rating Transport*$\text{weight}_{RRT}$+

Dependent Object Rating Transport*$\text{weight}_{DORT}$+

Hot Spot Rating Transport*$\text{weight}_{HSRT}$)/($\text{Weight}_{DRR}$+$\text{Weight}_{RRT}$+$\text{weight}_{DORT}$+$\text{weight}_{HSRT}$)

The overall rating is mapped to a graphical indicator (operation 608). An example of a mapping of a visual traffic light is:

Green for an aggregated rating <0.3
Yellow for an aggregated rating between 0.3 and 0.5, inclusive
Red for an aggregated rating >0.5.

Figure 7A:
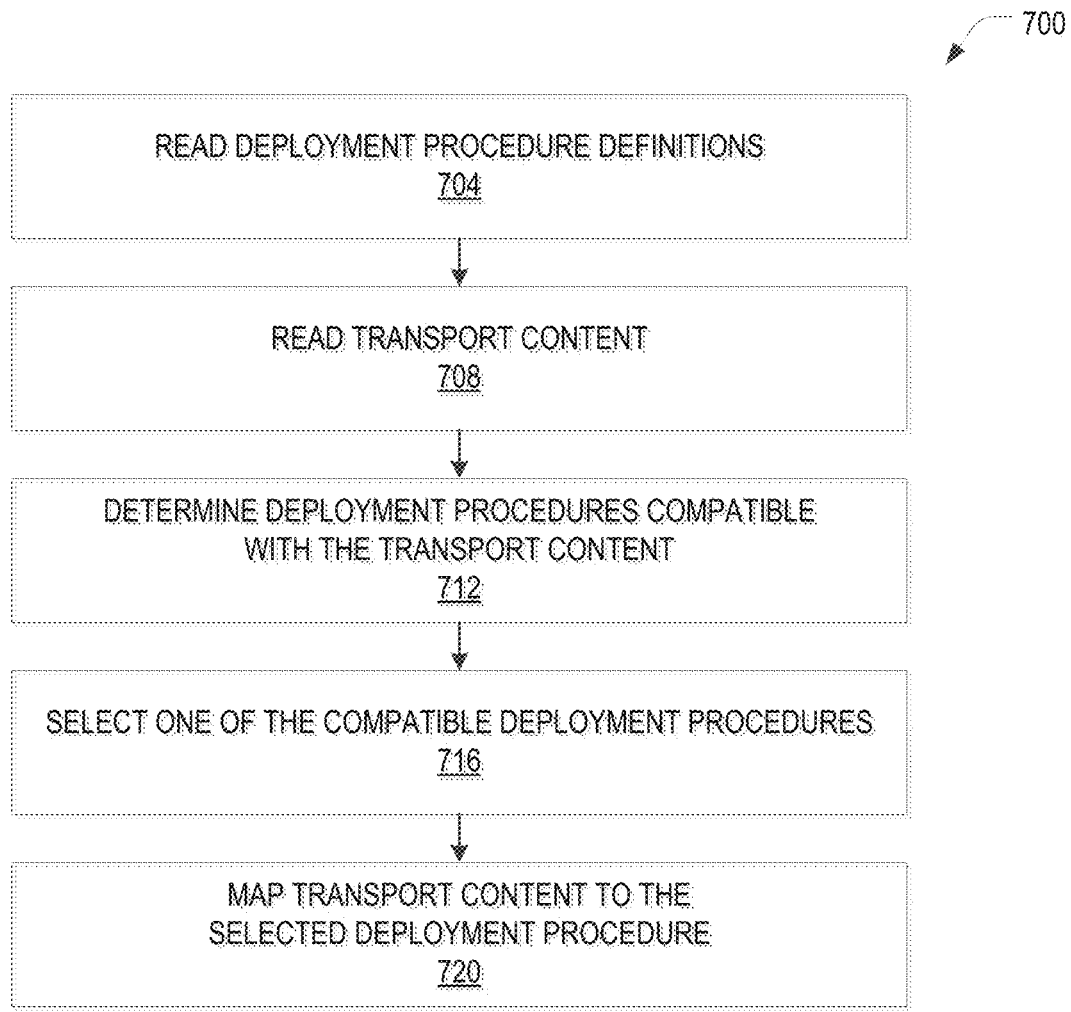
FIG. 7A is a flowchart for an example method for selecting a deployment procedure for deploying a software change, according to an example embodiment.

FIG. 7A is a flowchart for an example method 700 for selecting a deployment procedure for deploying a software change, according to an example embodiment. In one example embodiment, the method 700 is performed by the SSS 244. Each deployment procedure is suitable to deploy certain object types (e.g., to build archives only, ABAP sources only, ABAP source+DDIC, and the like), certain object volume ranges (e.g., 0 to 10,000 objects; greater than 10,000 objects), and the like. The available deployment procedures that are suitable for the software change are determined and rated based on the software change content.

Initially, the software support system 244 reads the deployment procedure definitions (operation 704). The transport content is read from the CTS 252 (operation 708) and the deployment procedures which are suitable for (are compatible with) the transport content are determined and rated, as described more fully below by way of example in conjunction with FIG. 7B (operation 712). If a procedure is efficient for, for example, 100,000 objects, and the transport contains only 10 objects, the deployment procedure may be given a lower rating. The compatible deployment procedures may be presented via the user interface.

One of the compatible deployment procedures is selected (operation 716). If more than one deployment procedure is feasible, the deployment procedure may be selected based on user preference, such as a desire for a deployment procedure with zero downtime, a desire for a deployment procedure with an undo feature, and the like. In one example embodiment, if more than one deployment procedure is feasible, the deployment procedure may be selected based on a deployment rating. The transport content is mapped to the selected deployment procedure based on the capability of the deployment procedure (operation 720). For example, the transport is analyzed for the contained object types (e.g., transport 1: report, UI; transport 2: DB table structure, DB table content). The deployment procedure support for each object type is evaluated (e.g., procedure 1: report, class; procedure 2: any type). If a transport contains any object type not supported by the procedure, the procedure is not capable of deploying the transport, thus the deployment procedure is not considered. For example, transport 1 can be deployed with procedure 1 or procedure 2; and transport 2 can only be deployed with procedure 2 since it contains a DB table structure definition and procedure 1 cannot deploy this object type.

Figure 7B:
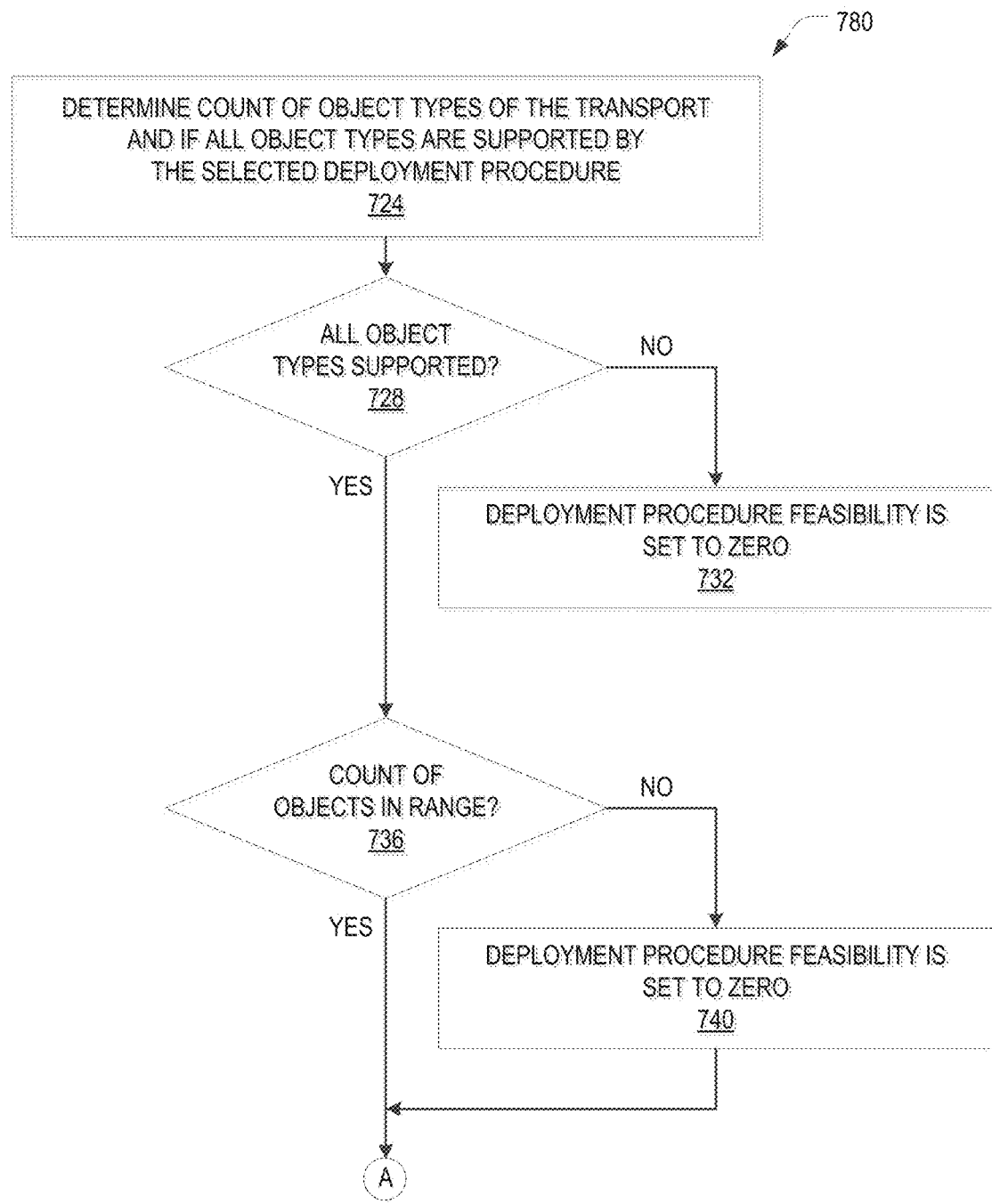
FIGS. 7B and 7C are a flowchart for an example method for determining a compatible deployment procedure and a suitable deployment time window for deploying a software change, according to an example embodiment.
Figure 7C:
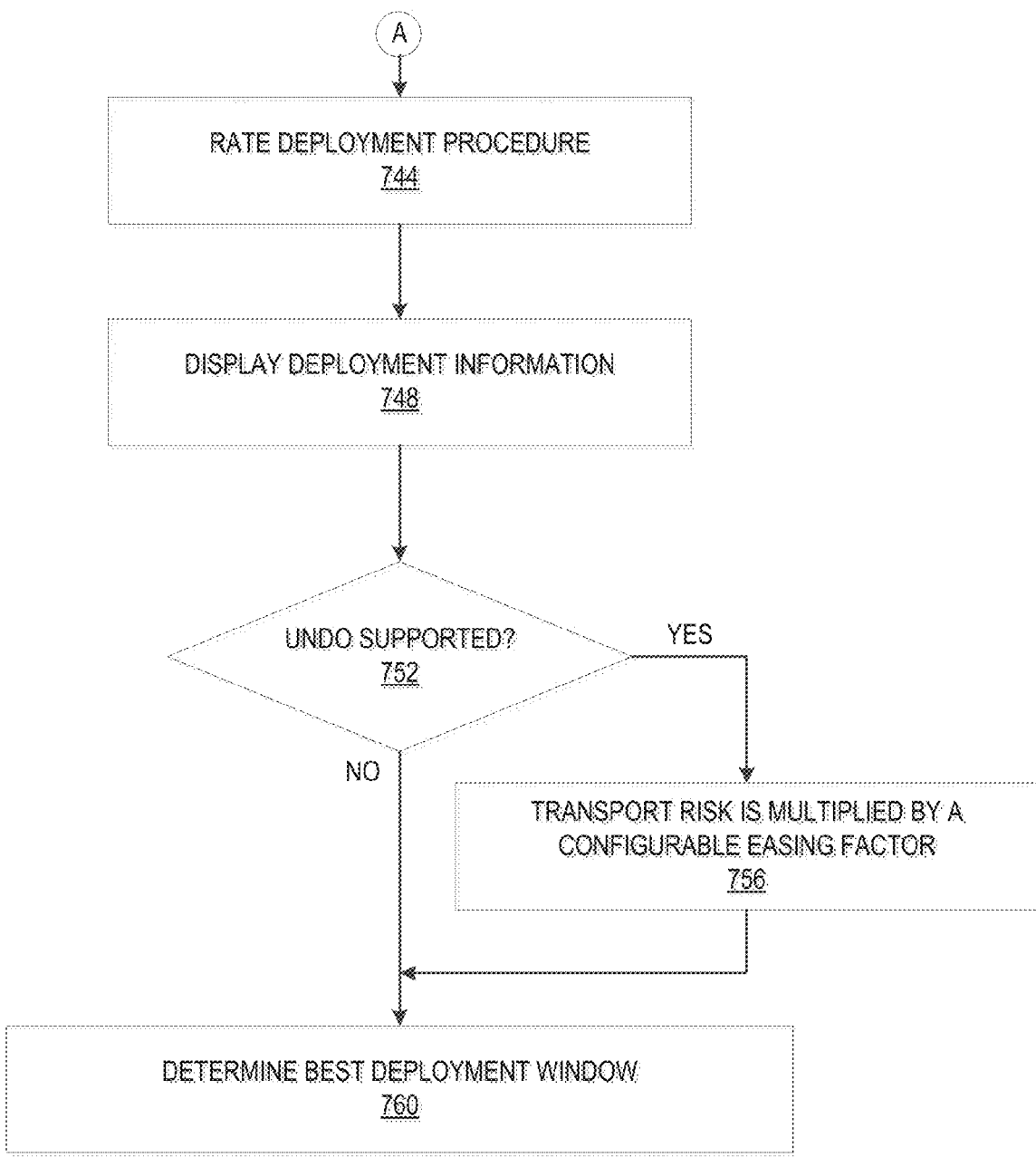

FIGS. 7B and 7C are a flowchart for an example method 780 for determining a compatible deployment procedure and a suitable deployment window for deploying a software change, according to an example embodiment. In one example embodiment, the method 780 is performed by the SSS 244.

A count of object types of the transport content is determined and a determination is made as to whether all the object types of the transport content are supported by the candidate deployment procedure (operation 724). A check is made to determine if all the object types of the transport content are supported by the candidate deployment procedure (operation 728). If all of the object types are not supported by the candidate deployment procedure, the deployment feasibility rating $DP_i$ is set to zero (operation 732) and the method 780 ends.

If all of the object types are supported by the candidate deployment procedure, a check is made to determine if the count of objects of the transport content is within the range of the candidate deployment procedure (operation 736). If the number of objects of the transport content is not within the range of the candidate deployment procedure, the deployment procedure feasibility rating $DP_i$ is set to zero (operation 740) and the method 780 proceeds to operation 744. In one example embodiment, the deployment procedure feasibility rating $DP_i$ is set equal to the $DP_i$ object count rating.

If the number of objects of the transport content is within the range of the candidate deployment procedure, then the method 780 proceeds to operation 744, where the candidate deployment procedure is rated. For example, a candidate deployment procedure with a ZDM capability is rated higher than a candidate deployment procedure without a ZDM capability. In one example embodiment, a set of capabilities that a deployment procedure can have are identified (e.g., an un-do capability, a zero downtime feature, feature toggle, an in-place feature (compared to replication required), an automatic deployment feature, and the like). The capabilities of the candidate deployment procedure are obtained and a deployment procedure capability rating is computed as $0.8**x$ where x is a count of the identified capabilities of the candidate deployment procedure. The deployment procedure ($DP_i$) feasibility rating may be based on the deployment procedure capability rating, the deployment procedure (Dpi) object count rating, or both. For example, the deployment procedure capability rating may be multiplied by the deployment procedure (Dpi) object count rating to determine the deployment procedure feasibility rating $DP_i$. The candidate deployment procedure rating, object range, the number of transports, an indication of the ZDM capability, and the like are displayed via the UI (operation 748).

A check is made to determine if an undo operation is supported by the deployment procedure (operation 752). If undo is supported, the rating Rating_Transport is multiplied by a configurable easing factor (e.g., 0.1) (operation 756).

The best deployment window is determined based on the number of dependent objects of the transport (NT) and the number of calls per hour per object during, for example, the last hour, the last 30 minutes, and the like (operation 760). The number of calls per hour per object may be shown in terms of, for example, a maximum (e.g., 100,000 per hour) or average (e.g., 5,000 per hour). (The calls for each dependent object are counted and the maximum value is determined as well as the average value. Details may be displayed such as the number of calls of the top 10 objects, the top 10% objects, and the like). This analysis shows the current system use and allows rating the impact of the software change, if the deployment is started immediately. Additional details may be provided, for example, the number of calls per hour for the last 24 hours, such as the maximum (e.g., 100,000 per hour) and average (e.g., 5,000). The details can be displayed, such as the number of calls, for example, for the top 10 objects, the top 15% objects, and the like. This analysis allows comparing the impact for an immediate deployment to a deployment at a later point in time, assuming the system usage is periodic (e.g., a period of 24 hours, if daily business operation is assumed as the system load). A machine can identify the hours for the last 24 hours with the lowest number of calls (e.g., maximum or average) to visualize a deployment point in time where the software deployment will have the expected minimal impact.

Visualization

Figure 8A:
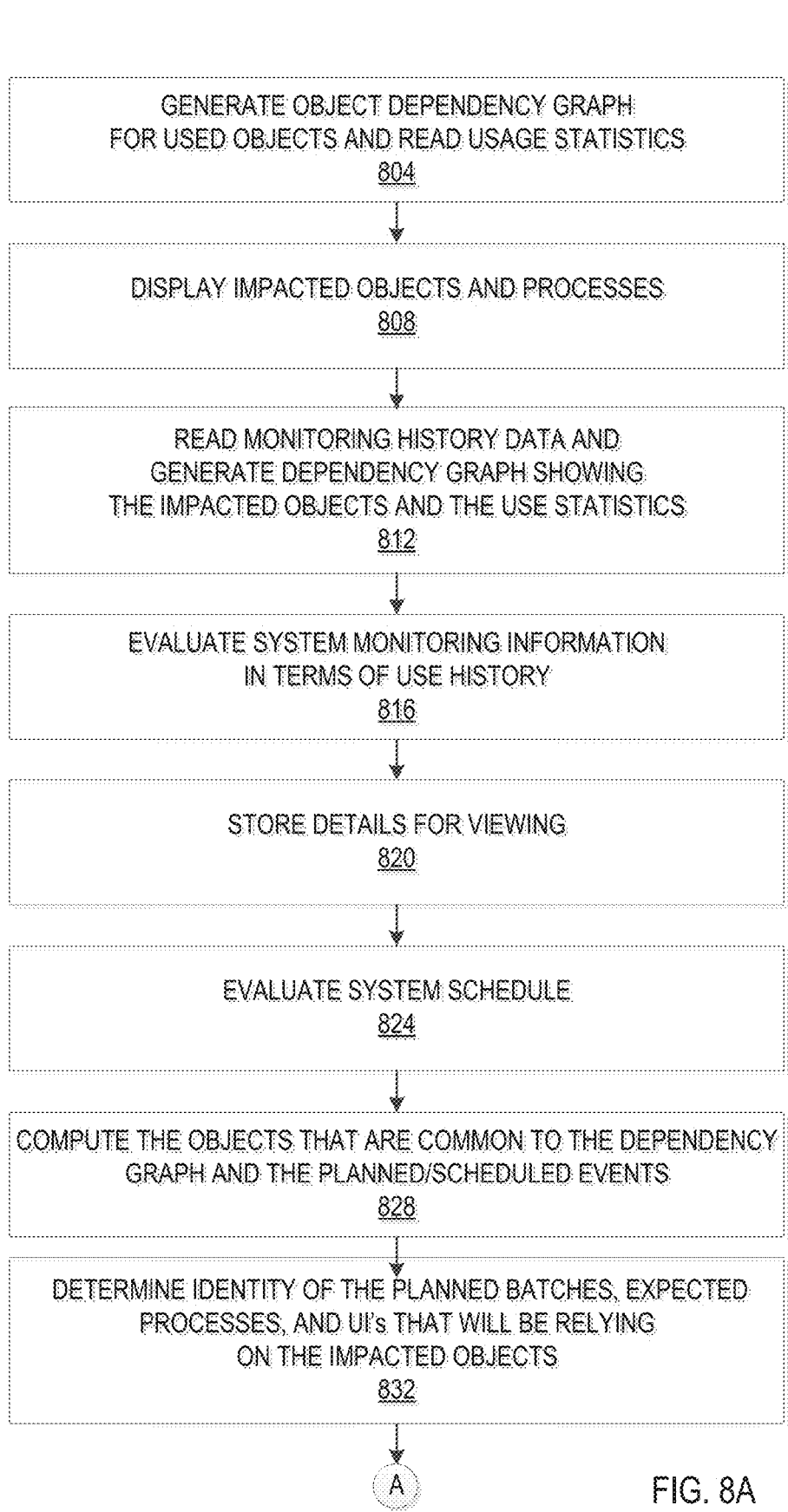
FIGS. 8A and 8B are a flowchart for an example method for visualizing the impact of a software change, according to an example embodiment.
Figure 8B:
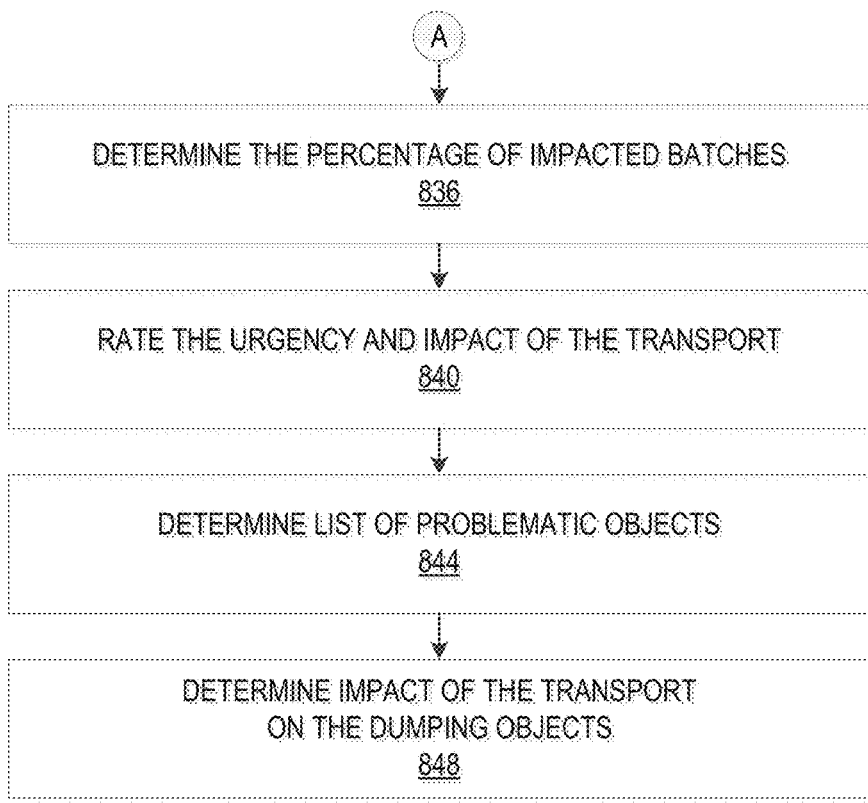

FIGS. 8A and 8B are a flowchart for an example method 800 for visualizing the impact of a software change, according to an example embodiment. In one example embodiment, the method 800 is performed by the SSS 244. For example, the information gathered by the system monitor 228 may be evaluated by the method 800.

In one example embodiment, an object dependency graph is generated as described above and the usage statistics for the objects in the object dependency graph are read (operation 804). The objects, processes, tiles, and the like that are impacted by the objects of the object dependency graph and that have been used, for example, during the last hour, are displayed. The frequency of use of the objects, processes, tiles, and the like and by how many users is displayed (operation 808). The parameters include the number of dependent objects and the number of calls per hour per object during, for example, the last hour, the last 30 minutes, and the like. The top 10, the top 5%, and the like of the number of calls per hour per object are stored for detailed viewing.

The history data is read and a graph is generated showing the relationship of the impacted objects and the use statistics of the impacted objects for, for example, the last 24 hours (operation 812). The system monitoring information is evaluated in terms of use history (operation 816). This allows determining if the current use is comparatively high or low, and allows rating whether the overall system is currently in a low load or high load period. The load rating can then be used to determine if it would be effective to deploy a software change right away or to delay deployment for a low load period. The parameters may include the number of calls per hour per object during, for example, the last 24 hours, the last 20 minutes, each hour window, and the like. (An hour window is a window of one hour in length for deploying the software change) The top 10, the top 15%, and the like of the number of calls per hour per object are stored for detailed viewing (operation 820).

In one example embodiment, the system schedule is obtained and evaluated (operation 824). An object dependency graph is computed and the objects that are common to the object dependency graph and the planned and scheduled events are computed (operation 828). The identity of the planned batches, expected processes, UIs, and the like that will be relying on the impacted objects is determined (operation 832). The parameters include the number of batch reports planned (NB) for, for example, each hour of the next 24 hours, and the number of batch reports impacted by the import (NI). The percentage of impacted batches may be determined and presented via the UI (operation 836). The percentage of impacted batches may be defined, for example, by NRI=NI/NB.

The urgency of the transport can be derived from the impact of the software deployment on problematic objects in the system, the problematic objects being objects which cause the application server runtime to report compile errors or runtime errors, a DB reporting inactive objects, and the like, (operation 840). The list of problematic objects can be determined from inactive objects, code causing compile or runtime errors, and the like. It is also determined if the transport contains objects which are on the list of problematic objects or if the dependent objects of the objects on the transport are on the list of the problematic objects. If the transport contains objects or has dependent objects being on the list of problematic objects, it is presented via the UI (operation 844). A user can then see that the transport will impact the problematic objects and it is likely that the problematic objects are repaired (e.g., the compile error is removed by the deployment of the transport). In one example embodiment, a drill-down option is provided to view details, such as a DumpList identifying the object(s) causing a problem and the number of objects on the list (NDumps). The impact of the transport on the dumping objects (the objects causing the problem) is determined and presented via the UI (operation 848). In one example embodiment, a drill-down option is provided to view details, such as the DumpListImpacted (e.g., the intersection of the objects causing the problem and the objects in the transport content; inducing the relative number: DumpListImpactedRelative). The dumping object that will be impacted by the transport (and hopefully be corrected by the transport) can be observed via the UI.

Figure 9A:
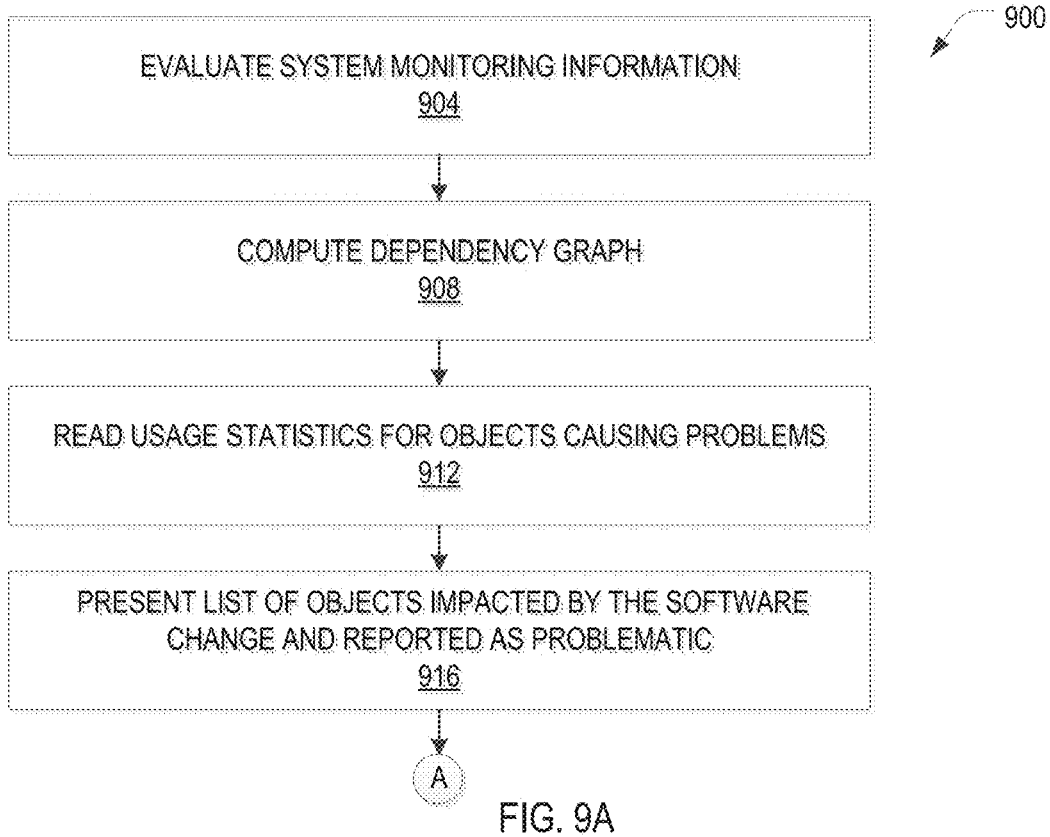
FIGS. 9A and 9B are a flowchart for an example method for visualizing the impact of a software change, according to an example embodiment.
Figure 9B:
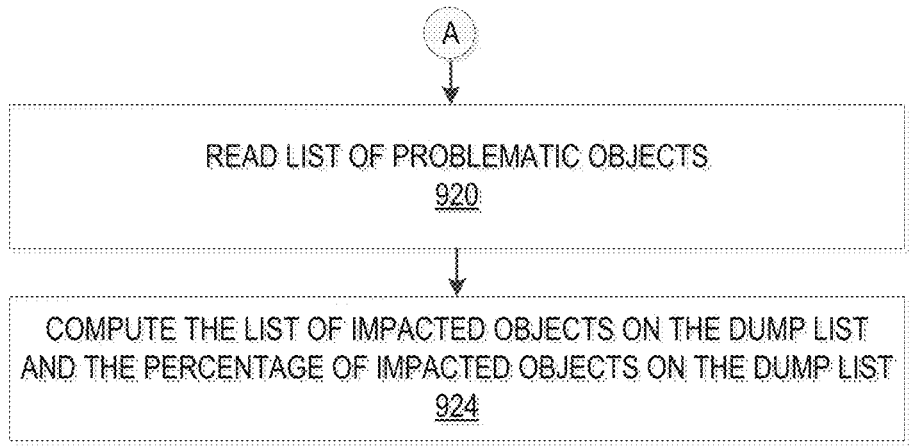

FIGS. 9A and 9B is a flowchart for an example method 900 for visualizing the impact of a software change, according to an example embodiment. In one example embodiment, the method 900 is performed by the SSS 244.

The system monitoring information is evaluated for dumps, alerts, and the like (if they are impacted or caused by the deployed software change) (operation 904). An object dependency graph is computed (as described above) (operation 908) and the usage statistics are read for the problematic objects in the object dependency graph (e.g., the objects that are causing the dumps, alerts, and the like) (operation 912). The list of objects which are impacted by the software change and which are reported by the monitoring of operation 904 are presented via the UI (operation 916). This allows for generating a rating if the software change to be deployed might address the current problem. (Note that a change can resolve a problem in a component without dependency being found by the system.) The list of problematic objects (such as objects causing dumps and aborts; DumpList and their number, NDumps) is read (operation 920). The list of impacted objects on the dump list (DumpListImpacted) and the percentage of impacted objects on the dump list (DumpListImpactedRelative=DumpListImpacted/NDumps) is computed (operation 924).

Figure 10:
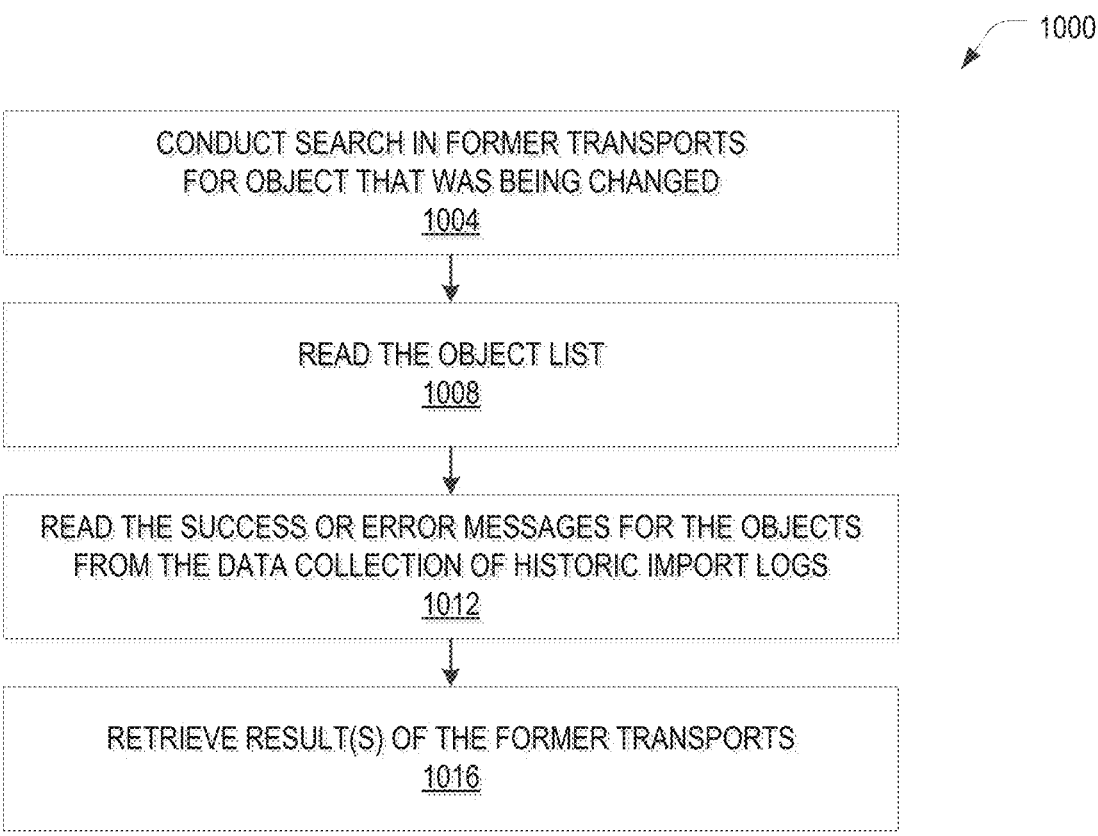
FIG. 10 is a flowchart for an example method for visualizing the impact of a software change, according to an example embodiment.

FIG. 10 is a flowchart for an example method 1000 for visualizing the impact of a software change, according to an example embodiment. In one example embodiment, the method 1000 is performed by the SSS 244.

For analysis after deployment, a "history" analysis makes use of the data provided by former deployments. A search can be conducted in former transports for an object that was changed (operation 1004). The list of objects of former transports is read from the CTS 252 (such as by the software support system 244) (operation 1008), and the success or error messages for the objects are read from the data collection of historic import logs (operation 1012). The result of the former transports can be retrieved and displayed (operation 1016). This allows, for example, a user to see how often a certain object is changed and whether the deployment of these changes typically was successful or not. The result (the success or failure of the transport, the functionality that continues to work, the problems that have been fixed, new problems that have occurred, and the like) of the former transports can be retrieved and displayed.

After the deployment analysis, data is presented via the UI and persisted for further transport historical analysis. The deployment statistics are collected (e.g., return code, duration, downtime, and the like). The deployment impact is determined, such as the number of dependent objects touched or re-generated, terminated user sessions, dumps, and the like. This allows assessing whether the impact analysis done before the deployment is meaningful or not. The impact analysis data needs to be compared with the data collected here.

System behavior after deployment is also analyzed for changes in performance, I/O, and other parameters. This allows for assessing the impact of certain object changes on global system behavior, e.g., for configuration changes, migrations of large tables, changing communication mechanisms, and the like. If the change came with an undo capability or a feature toggle, it is still possible to revert back to the version before the software change if, for example, performance is degraded.

User behavior after deployment is analyzed to determine, for example, if certain transactions are no longer being completed, if runtime errors occur more often, if incidents are reported, if "wrong" buttons are clicked, and the like. This can indicate that the UI design is not intuitive or user-friendly.

In one example embodiment, data regarding the reaction of the system and the reaction of users to the deployment of the change (such as compile errors, runtime errors, generation errors, decreased performance, and the like) can be stored for future review. Each deployed change is analyzed, and the results of the deployment (such as the return code, duration, downtime, and the like) are persisted along with data about the software change.

Figure 11:
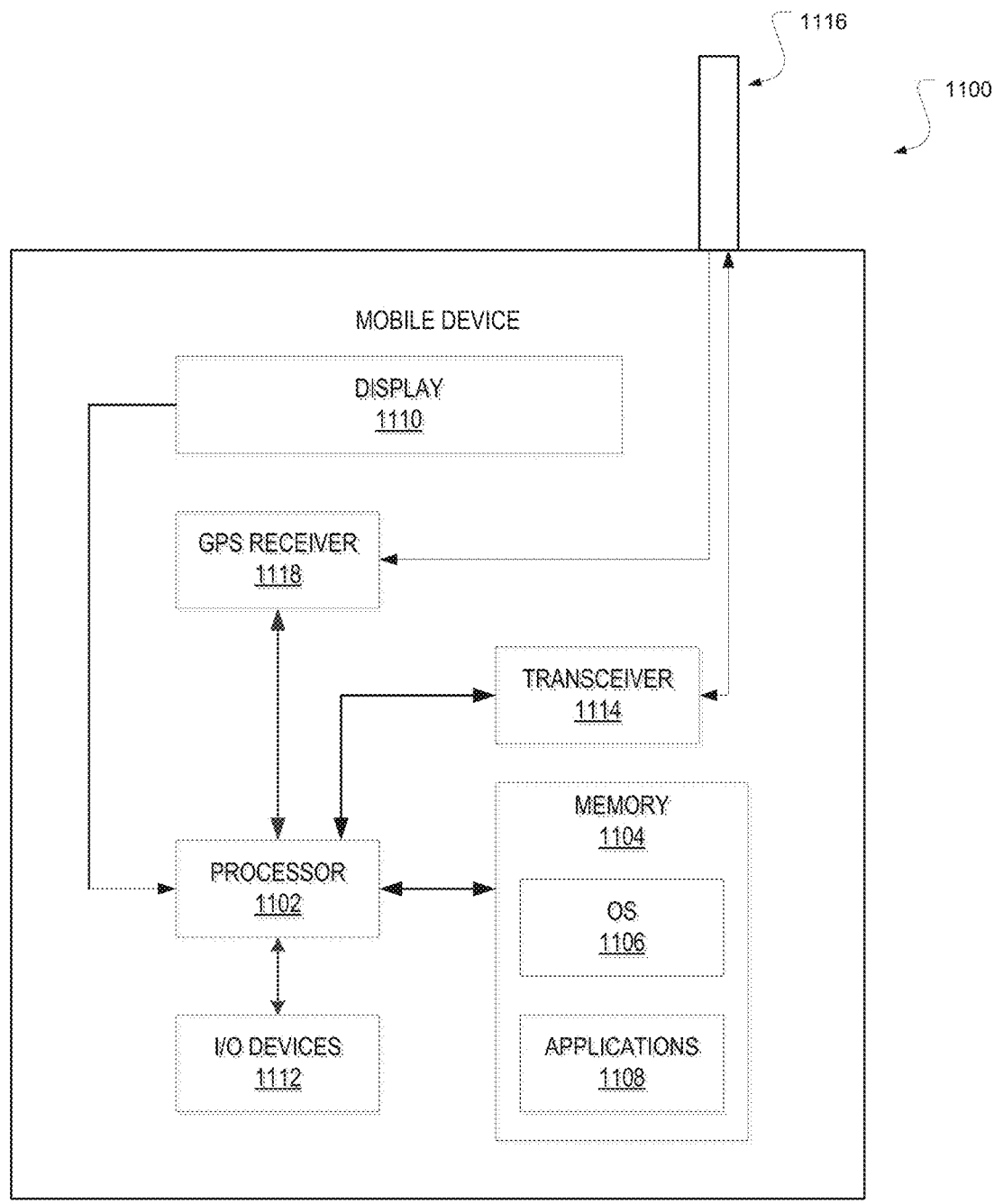
FIG. 11 is a block diagram illustrating a mobile device, according to an example embodiment.

FIG. 11 is a block diagram illustrating a mobile device 1100, according to an example embodiment. The mobile device 1100 can include a processor 1102. The processor 1102 can be any of a variety of different types of commercially available processors suitable for mobile devices 1100 (for example, an XScale architecture microprocessor, a Microprocessor without Interlocked Pipeline Stages (MIPS) architecture processor, or another type of processor). A memory 1104, such as a random access memory (RAM), a Flash memory, or other type of memory, is typically accessible to the processor 1102. The memory 1104 can be adapted to store an operating system (OS) 1106, as well as applications 1108, such as a mobile location-enabled application that can provide location-based services (LBSs) to a user. The processor 1102 can be coupled, either directly or via appropriate intermediary hardware, to a display 1110 and to one or more input/output (I/O) devices 1112, such as a keypad, a touch panel sensor, and a microphone. Similarly, in some embodiments, the processor 1102 can be coupled to a transceiver 1114 that interfaces with an antenna 1116. The transceiver 1114 can be configured to both transmit and receive cellular network signals, wireless data signals, or other types of signals via the antenna 1116, depending on the nature of the mobile device 1100. Further, in some configurations, a global positioning system (GPS) receiver 1118 can also make use of the antenna 1116 to receive UPS signals.

Figure 12:
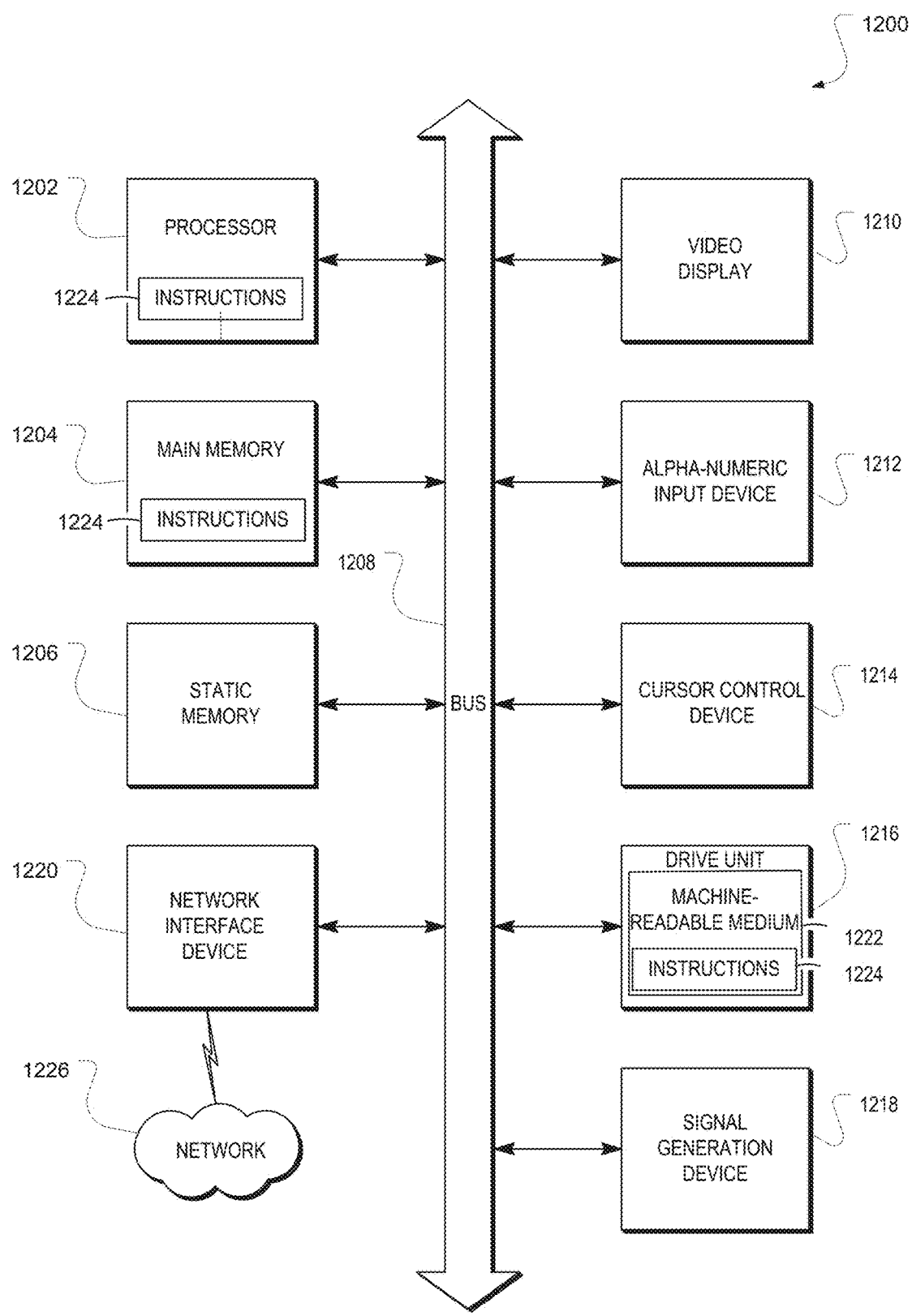
FIG. 12 is a block diagram of a computer processing system within which a set of instructions may be executed for causing a computer to perform any one or more of the methodologies discussed herein.

FIG. 12 is a block diagram of a computer processing system 1200 within which a set of instructions 1224 may be executed for causing a computer to perform any one or more of the methodologies discussed herein. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment.

In addition to being sold or licensed via traditional channels, embodiments may also, for example, be deployed by software-as-a-service (SaaS), application service provider (ASP), or by utility computing providers. The computer may be a server computer, a personal computer (PC), a tablet PC, a personal digital assistant (PDA), a cellular telephone, or any processing device capable of executing a set of instructions (sequential or otherwise) that specify actions to be taken by that device. Further, while only a single computer is illustrated, the term "computer" shall also be taken to include any collection of computers that, individually or jointly, execute a set (or multiple sets) of instructions to perform any one or more of the methodologies discussed herein.

The example computer processing system 1200 includes a processor 1202 (e.g., a central processing unit (CPU), a graphics processing unit (GPU), or both), a main memory 1204, and a static memory 1206, which communicate with each other via a bus 1208. The computer processing system 1200 may further include a video display 1210 (e.g., a plasma display, a liquid crystal display (LCD), or a cathode ray tube (CRT)). The computer processing system 1200 also includes an alphanumeric input device 1212 (e.g., a keyboard), a user interface (UI) navigation (e.g., cursor control) device 1214 (e.g., a mouse and/or touch screen), a drive unit 1216, a signal generation device 1218 (e.g., a speaker), and a network interface device 1220.

The drive unit 1216 includes a machine-readable medium 1222 on which is stored one or more sets of instructions 1224 and data structures embodying or utilized by any one or more of the methodologies or functions described herein. The instructions 1224 may also reside, completely or at least partially, within the main memory 1204, the static memory 1206, and/or within the processor 1202 during execution thereof by the computer processing system 1200, the main memory 1204, the static memory 1206, and the processor 1202 also constituting tangible machine-readable media 1222.

The instructions 1224 may further be transmitted or received over a network 1226 via the network interface device 1220 utilizing any one of a number of well-known transfer protocols (e.g., Hypertext Transfer Protocol).

While the machine-readable medium 1222 is shown in an example embodiment to be a single medium, the term "machine-readable medium" should be taken to include a single medium or multiple media (e.g., a centralized or distributed database, and/or associated caches and servers) that store the one or more sets of instructions 1224. The term "machine-readable medium" shall also be taken to include any medium that is capable of storing, encoding, or carrying a set of instructions 1224 for execution by the computer and that cause the computer to perform any one or more of the methodologies of the present application, or that is capable of storing, encoding, or carrying data structures utilized by or associated with such a set of instructions 1224. The term "machine-readable medium" shall accordingly be taken to include, but not be limited to, solid-state memories and optical and magnetic media.

While the embodiments of the invention(s) is (are) described with reference to various implementations and exploitations, it will be understood that these embodiments are illustrative and that the scope of the invention(s) is not limited to them. In general, techniques for maintaining consistency between data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A computerized method, the method comprising:
    obtaining, using one or more hardware processors, software change information of a plurality of changed objects of a software package, the software change information comprising a name of an object being changed and a type of the object being changed;
    generating, using the one or more hardware processors, an object dependency graph for the object, the object dependency graph providing a data structure for identifying dependency relationships of the object being changed;
    retrieving, from a database, usage statistics characterizing a usage by a hardware processor of the object and the object type;
    determining, using the one or more hardware processors, an identity of a first module impacted by the software change based on the data structure;
    generating, using the one or more hardware processors, an overall development readiness rating based at least in part on a sum of module development readiness ratings for a plurality of modules impacted by the software change, the plurality of modules including the first module, wherein a first module development readiness rating for the first module is computed at least in part by multiplying a percentage of test coverage for the first module and a percentage of successful tests for the first module; and
    generating, using the one or more hardware processors, an overall rating of the software change based at least in part on the usage by the hardware processor and at least in part on the overall development readiness rating, the overall rating comprising one or more component ratings.

2. The computerized method of claim 1, further comprising retrieving usage statistics for an object dependent on the object and an object type of the dependent object.

3. The computerized method of claim 1, further comprising:
    determining, using the one or more hardware processors an overall relative object list rating, the overall relative object list rating computed by dividing an object list rating by a count of objects in the software package, the object list rating based on a summation of an object type rating for each object type in the software package, each object type rating computed by multiplying a count of objects of the corresponding object type and an object criticality rating, wherein the generating of the overall rating is also based at least in part on the overall development readiness rating.

4. The computerized method of claim 3, wherein each object type rating is multiplied by an object toggle-ability factor prior to performing the summation of the object type rating for each object type in the software package.

5. The computerized method of claim 1, further comprising:

determining, using the one or more hardware processors, an overall relative transport dependency rating the overall relative transport dependency rating, the overall relative transport dependency rating computed by dividing a dependency rating by a count of objects in the software package, the dependency rating based on a summation of an object type dependency rating for each object type in the software package, each object type dependency rating computed by multiplying a count of objects of the corresponding object type and an object criticality rating, wherein the generating of the overall rating is also based at least in part on the overall development readiness rating.

6. The computerized method of claim 1, further comprising:
determining, using the one or more hardware processors, an overall hot spot hits rating; and
determining an identity of objects common to objects of the object dependency graph and a list of critical objects, the overall hot spot hits rating based on a summation of a hot spot hits rating for each identified object, each hot spot hits rating computed by multiplying a count of identified objects of the corresponding object type and an object criticality rating.

7. The computerized method of claim 1, further comprising mapping the overall rating to a user interface element to visually indicate a rating range of the overall rating and displaying the overall rating and the user interface element.

8. The computerized method of claim 1, further comprising:
weighting the usage by the hardware processor;
weighting the overall development readiness rating; and
summing the weighted component ratings.

9. The computerized method of claim 1, further comprising:
generating a used object dependency graph for a used object; and
displaying an identity of used object and a process impacted by the used object.

10. The computerized method of claim 9, further comprising:
obtaining a list of scheduled events;
determining one or more objects associated with the list of scheduled events;
determining an object common to the object dependency graph and the determined one or more objects; and
determining an identity of an entity configured to rely on the common object.

11. The computerized method of claim 10, further comprising:
determining a percentage of impacted batches;
determining a list of problematic objects; and
determining an impact of the software package on a dumping object.

12. The computerized method of claim 11, further comprising:
reading usage statistics for problematic objects in the object dependency graph;
computing a list of objects on a dump list that are impacted and a percentage of impacted objects on the dump list; and
presenting the list of objects impacted by the software change and the list of objects on the dump list.

13. The computerized method of claim 1, further comprising:
conducting a search in a former software package for an object that was changed;
reading an object list and a success or error message for the changed object from a data collection of historic import logs; and
retrieving a result of the former software package.

14. A computerized system, comprising:
one or more hardware processors; and
a machine-readable medium comprising instructions thereon that, when executed by the one or more hardware processors, causes the one or more hardware processors to execute operations comprising:
obtaining software change information of a plurality of changed objects of a software package, the software change information comprising a name of an object being changed and a type of the object being changed;
generating an object dependency graph for the object, the object dependency graph providing a data structure for identifying dependency relationships of the object being changed;
retrieving, from a database, usage statistics characterizing a usage by a hardware processor of the object and the object type;
determining an identity of a first module impacted by the software change based on the data structure;
generating, using the one or more hardware processors, an overall development readiness rating based at least in part on a sum of module development readiness ratings for a plurality of modules impacted by the software change, the plurality of modules including the first module, wherein a first module development readiness rating for the first module is computed at least in part by multiplying a percentage of test coverage for the first module and a percentage of successful tests for the first module; and
generating an overall rating of the software change based at least in part on the usage by the hardware processor and at least in part on the overall development readiness rating, the overall rating comprising one or more component ratings.

15. The computerized system of claim 14, wherein the machine-readable medium further comprises instructions that, when executed by the one or more hardware processors, causes the one or more hardware processors to execute operations comprising retrieving usage statistics for an object dependent on the object and an object type of the dependent object.

16. The computerized system of claim 14, wherein the machine-readable medium further comprises instructions that, when executed by the one or more hardware processors, causes the one or more hardware processors to execute operations comprising:
determining an overall relative object list rating computed by dividing an object list rating by a count of objects in the software package, the object list rating based on a summation of an object type rating for each object type in the software package, each object type rating computed by multiplying a count of objects of the corresponding object type and an object criticality rating, wherein the generating of the overall rating is also based at least in part on the overall development readiness rating.

17. The computerized system of claim 16, wherein each object type rating is multiplied by an object toggle-ability factor prior to performing the summation of the object type rating for each object type in the software package.

18. The computerized system of claim 14, wherein the machine-readable medium further comprises instructions that, when executed by the one or more hardware processors, causes the one or more hardware processors to execute operations comprising:

generating an overall relative transport dependency rating, the overall relative transport dependency rating computed by dividing a dependency rating by a count of objects in the software package, the dependency rating based on a summation of an object type dependency rating for each object type in the software package, each object type dependency rating computed by multiplying a count of objects of the corresponding object type and an object criticality rating, wherein the generating of the overall rating is also based at least in part on the overall development readiness rating.

19. The computerized system of claim 14, wherein the machine-readable medium further comprises instructions that, when executed by the one or more hardware processors, causes the one or more hardware processors to execute operations comprising:

determining an overall hot spot hits rating; and
determining an identity of objects common to objects of the object dependency graph and a list of critical object, the overall hot spot hits rating based on a summation of a hot spot hits rating for each identified object, each hot spot hits rating computed by multiplying a count of identified objects of the corresponding object type and an object criticality rating.

20. A non-transitory machine-readable medium comprising instructions thereon that, when executed by one or more hardware processors, causes the one or more hardware processors to execute operations comprising:

obtaining software change information of a plurality of changed objects of a software package, the software change information comprising a name of an object being changed and a type of the object being changed;

generating an object dependency graph for the object, the object dependency graph providing a data structure for identifying dependency relationships of the object being changed;

retrieving, from a database, usage statistics characterizing a usage by a hardware processor of the object and the object type;

determining an identity of a module impacted by the software change based on the data structure;

generating an overall development readiness rating based at least in part on a summation of a module development readiness rating of the module, the module development readiness rating computed by multiplying a percentage of test coverage for the module and a percentage of successful tests for the module; and generating an overall rating of the software change based at least in part on the usage by the hardware processor and at least in part on the overall development readiness rating, the overall rating comprising one or more component ratings.

* * * * *